US010679444B2

(12) United States Patent
Fieglein et al.

(10) Patent No.: US 10,679,444 B2
(45) Date of Patent: *Jun. 9, 2020

(54) FUEL DISPENSER DOOR LOCK AND ALARM CONTROL

(71) Applicant: Wayne Fueling Systems LLC, Austin, TX (US)

(72) Inventors: Henry Fieglein, Cedar Park, TX (US); Richard Carlsson, Malmo (SE); Scott R. Negley, III, Austin, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,090

(22) Filed: Jan. 28, 2019

(65) Prior Publication Data

US 2019/0172290 A1 Jun. 6, 2019

Related U.S. Application Data

(63) Continuation of application No. 15/623,648, filed on Jun. 15, 2017, now Pat. No. 10,192,381.
(Continued)

(51) Int. Cl.
*G06F 21/44* (2013.01)
*G07C 9/00* (2020.01)
(Continued)

(52) U.S. Cl.
CPC ........... *G07C 9/00571* (2013.01); *B67D 7/34* (2013.01); *G07C 9/00174* (2013.01);
(Continued)

(58) Field of Classification Search
None
See application file for complete search history.

(56) References Cited

U.S. PATENT DOCUMENTS

| | | | |
|---|---|---|---|
| 4,410,949 | A | 10/1983 | Huellinghorst et al. |
| 5,867,403 | A | 2/1999 | Sasnett et al. |

(Continued)

FOREIGN PATENT DOCUMENTS

| | | | |
|---|---|---|---|
| GB | 2529638 | A | 3/2016 |
| WO | 2012054942 | A1 | 5/2012 |

OTHER PUBLICATIONS

International Search Report with Written Opinion corresponding to International Patent Application No. PCT/US2017/037623, dated Sep. 21, 2017, 8 pages.

*Primary Examiner* — K. Wong
(74) *Attorney, Agent, or Firm* — Mintz Levin Cohn Ferris Glovsky and Popeo, P.C.

(57) ABSTRACT

In general, a smart door alarm and locking mechanism and methods for use thereof are provided for maintaining security while providing ease of access to a fuel dispenser. In an exemplary embodiment, the methods and devices are used in fuel dispensing devices for providing fuel to a vehicle. However, the methods and devices can be utilized in any device having a payment system where security and access are both required. In some embodiments, the described methods and systems include a door alarm and door lock kit that allow unlocking one or more doors in a housing of a fuel dispenser and simultaneously disabling or de-activating respective door alarm sensor(s). In a similar manner, the door can be locked and the door alarm sensor activated or re-activated substantially simultaneously.

19 Claims, 20 Drawing Sheets

Related U.S. Application Data

(60) Provisional application No. 62/350,350, filed on Jun. 15, 2016.

(51) Int. Cl.

| | |
|---|---|
| ***G08B 13/08*** | (2006.01) |
| ***G07F 13/02*** | (2006.01) |
| ***G07F 9/10*** | (2006.01) |
| ***B67D 7/34*** | (2010.01) |
| ***G08B 3/10*** | (2006.01) |
| *B67D 7/06* | (2010.01) |

(52) U.S. Cl.

CPC ..... *G07C 9/00182* (2013.01); *G07C 9/00563* (2013.01); *G07F 9/10* (2013.01); *G07F 13/025* (2013.01); *G08B 3/10* (2013.01); *G08B 13/08* (2013.01); *B67D 7/067* (2013.01); *G07C 9/00896* (2013.01)

(56) References Cited

U.S. PATENT DOCUMENTS

| | | | |
|---|---|---|---|
| 7,370,791 | B2 | 5/2008 | O'Dougherty et al. |
| 8,539,800 | B2 | 9/2013 | Chen et al. |
| 9,580,295 | B2 * | 2/2017 | Bergqvist .............. H04L 63/061 |
| 10,192,381 | B2 * | 1/2019 | Fieglein .................... G07F 9/10 |
| 2003/0085796 | A1 | 5/2003 | Smith |
| 2008/0103980 | A1 | 5/2008 | Finley et al. |
| 2008/0238669 | A1 | 10/2008 | Linford |
| 2015/0106196 | A1 | 4/2015 | Williams et al. |
| 2016/0321655 | A1 | 11/2016 | Williams et al. |
| 2017/0355588 | A1 | 12/2017 | Fieglein |

* cited by examiner

FUEL DISPENSER DOOR LOCK AND ALARM CONTROL

CROSS REFERENCE TO RELATED APPLICATIONS

This application is a continuation of U.S. application Ser. No. 15/623,648 (now U.S. Pat. No. 10,192,381) entitled Fuel Dispenser Door Lock and Alarm Control, filed Jun. 15, 2017, which is a non-provisional application of U.S. Application No. 62/350,350 entitled "Fuel Dispenser Door Lock and Alarm Control," filed Jun. 15, 2016, which is hereby incorporated by reference herein in its entirety.

FIELD

Methods and devices for controlling a door lock and alarm on a fuel dispenser are provided.

BACKGROUND

Prior to pay-at-the-pump technology, gasoline service stations were typically equipped with an attendant-operated terminal for manually transacting fuel purchases. This type of terminal was ordinarily situated in a central location, normally the sales office, and self-service customers were required to pay for gasoline at this location. So long as each fuel dispensing pump was "enabled," i.e., ready for pumping without attendant intervention, a customer merely had to park his car at one of the fuel islands, pump the gasoline and then walk to the central location to pay for the gasoline purchase.

However, the problem of "drive-offs" often required service station operators to avoid leaving the fuel dispensers in a normally enabled state. A "drive-off" occurred whenever a car refueling at a remote, enabled fuel dispenser drove off without paying for the gasoline. This situation led to the installation of equipment to remotely enable the fuel dispensers from the central location. It also led to requiring the customer to make a pre-payment for gasoline before the attendant enabled the fuel dispenser. However, such prepayment could only be made at the central location, requiring the customer to park his car at one of the fuel islands and walk to the central location to tender pre-payment by cash, debit card, credit card and the like. After making the pre-payment, the customer would walk back to the fuel island and dispense the gasoline. After the fuel dispensing was done, the customer would return to the central location to complete the sales transaction by obtaining any change due, picking up a cash receipt, signing a credit card slip or performing any similar action. The procedure was time consuming and inconvenient to the customer and frequently resulted in lost sales to the service station operator.

Consequently, the option for paying for fuel purchases at the pump without the need to walk to the central location for pre-payment or post-pumping wrap-up has become increasingly popular to the motoring public. Such a point of sale system allows for payment using a customer credit card or cash or other known payment means, and can automatically enable fuel dispensers directly from a fuel island. While pay-at-the-pump systems are convenient for the customer, there is a risk of theft of fuel and payment card data. Thieves will open the fuel dispenser door and can either manipulate the pump to dispense fuel without requiring payment, or can steel confidential customer payment information.

To combat this theft, many dispensers are manufactured or retro-fit with a door alarm and monitoring system to help protect against unauthorized fuel dispenser entry. The door alarm will sound an alarm and shut down the pump when the dispenser door is opened without proper authorization. In order to service the fuel dispenser, a two step access process must be following. First, the door must be unlocked using a key. Second, a password must be input into the outdoor payment terminal. These are separate processes that must be performed in the correct order to prevent the dispenser from being locked. Additionally, once service is complete, the authorized service agent or the clerk must remember to reactivate the door alarm so as to ensure that the dispenser is protected against unauthorized access. This can be burdensome, particularly with dispensers that are retro-fit with a door alarm kit, as these dispensers often require the door to be opened every time the printer paper needs to be changed.

Accordingly, there remains a need for improved methods and devices for maintaining security on a fuel dispenser, while also enabling ease of access for an authorized service agent or station owner/employee.

SUMMARY

Various fuel dispensers, fuel dispensers components and kits, and methods are provided having means for controlling access to one or more doors of the fuel dispenser.

In one embodiment, a fuel dispenser is provided and includes a housing having a base module with fuel dispensing components disposed therein, and an electronics module with electronics for controlling the fuel dispensing components. At least one door is coupled to the housing and is associated with at least one locking mechanism configured to lock and unlock the at least one door to control access to components within the housing. The dispenser also includes a door alarm sensor configured to sense when the at least one door is locked and unlocked, and an alarm/lock controller disposed in the housing and coupled to the at least one locking mechanism and the door alarm sensor. The alarm/lock controller is configured to control the at least one locking mechanism and the door alarm sensor. A reader is operatively coupled to the controller such that the controller is configured to unlock the at least one locking mechanism and to de-activate the door alarm sensor in response to the reader receiving and authenticating a first input.

While the dispenser can have a variety of configurations, in one embodiment the alarm/lock controller is configured to lock the at least one locking mechanism and to activate the door alarm sensor in response to the reader receiving and authenticating a second input. For example, in response to the first input, the alarm/lock controller transmits at least one first signal to cause the at least one locking mechanism to unlock and to cause the door alarm to de-activate, and, in response to the second input, the alarm/lock controller transmits at least one second signal to cause the at least one locking mechanism to lock and to cause the door alarm to activate.

In other aspects, the reader is configured to obtain information stored on a portable access device. For example, the reader can be a contactless near field communication reader. As another example, the reader can be configured to obtain at least one type of biometrics information from a user. The door alarm sensor can also have various configurations and can be, for example, a magnetic sensor.

In another embodiment, when the at least one locking mechanism is unlocked and the door alarm sensor is deactivated, the fuel dispenser provides an indication indicating that the at least one locking mechanism is unlocked and door alarm sensor is de-activated.

The at least one door can be at least one of a first door on the base module controlling access to the fuel dispensing components, a second door on the electronics module controlling access to the electronics module, and a third door on the electronics module controlling access to a printer of the electronics module.

The fuel dispenser can also include a fuel controller coupled to the fuel dispensing components in the base module. The reader can be configured to instruct the fuel controller to disallow use of the fuel dispensing components when the at least one locking mechanism is unlocked and the door alarm sensor is de-activated.

The at least one locking mechanism can have various configurations, and can be an electronic locking mechanism having a latch movable between a locked position in which the latches engages the at least one door to prevent movement of the door, and an unlocked position in which the latches is disengaged from the at least one door to allow the door to be opened.

The fuel dispenser can also include a wireless communication module coupled to the reader and configured to receive the first input from reader and to wirelessly transmit the first input received to a network cloud to authenticate the first input. The dispenser can also include an alarm coupled to the alarm/lock controller and configured to transmit an audible signal.

In another embodiment, a door lock and alarm control kit for use with a fuel dispenser is provided. The kit can include an alarm/lock controller configured to be mounted within a housing in a fuel dispenser, and at least one electronic door locking mechanism electrically coupled to alarm/lock controller such that the alarm/lock controller is configured to cause the at least one electronic door locking mechanism to switch between a locked configuration, in which a latch on the electronic door locking mechanism is closed, and an unlocked configuration, in which the latch on the electronic door locking mechanism is open. The kit can also include at least one door alarm sensor coupled to the alarm/lock controller and having a first component configured to be mounted in a fuel dispenser and a second component configured to be mounted on a door of a fuel dispenser such that the at least one door alarm sensor can detect open and closed positions of the door.

In certain aspects, the kit can include a reader configured to receive information from a portable access device. The reader can be, for example, a near field communication reader. The kit can also include a portable access device configured to store information to be transmitted to the reader. The alarm/lock controller can be configured to switch the at least one locking mechanism to the unlocked configuration and to de-activate the door alarm sensor in response to the reader obtaining information from a portable access device. The alarm/lock controller can also be configured to cause the at least one locking mechanism to move to the locked configuration and to activate the door alarm sensor in response to the reader reading obtaining information from a portable access device.

The kit can also include an alarm configured to emit an audible signal if the at least one door alarm sensor detects an open position of the door and the at least one reader has not obtained information from a portable access device.

In other aspects, the kit can include a wireless communication module coupled to the reader and configured to wirelessly communicate with a network cloud to authenticate information obtained by the reader from a portable access device.

Methods for controlling a door alarm and lock on a fuel dispenser are also provided and in one embodiment the method can include receiving a first input from a portable access device, and authenticating the first input. If the first input is authenticated, at least one door locking mechanism on a door of a fuel dispenser can be unlocked thereby allowing the door to be opened, and a door alarm sensor coupled to the door and to an alarm can be de-activated. The method can also include receiving a second input from a portable access device and authenticating the second input. If the second input is authenticated, the at least one door locking mechanism on the door can be locked thereby preventing the door from opening, and the door alarm sensor coupled to the door and to an alarm can be activated such that the alarm will sound if the door is opened. In one embodiment, an alarm/lock controller can cause the at least one door locking mechanism on the door to lock and unlock and can cause the door alarm sensor to be de-activated and activated.

In certain aspects, the first and second inputs are received by a reader, and the first and second inputs are authenticated by a wireless communication module that wireles sly transmits the first and second inputs to a cloud network. In some aspects, the first and second inputs are received by a biometrics reader, and the first and second inputs are authenticated by a server in communication with the fuel dispenser. The server can be a cloud network server.

The fuel dispenser can also include a payment module having a reader that obtains the first and second inputs. In one embodiment, the reader can be a near field communication reader and the first and second inputs are received from at least one of a card and a mobile telephone. The method can also include preventing the fuel dispenser from dispensing fuel when the at least one locking mechanism is unlocked and the door alarm sensor de-activated.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Figure 1:
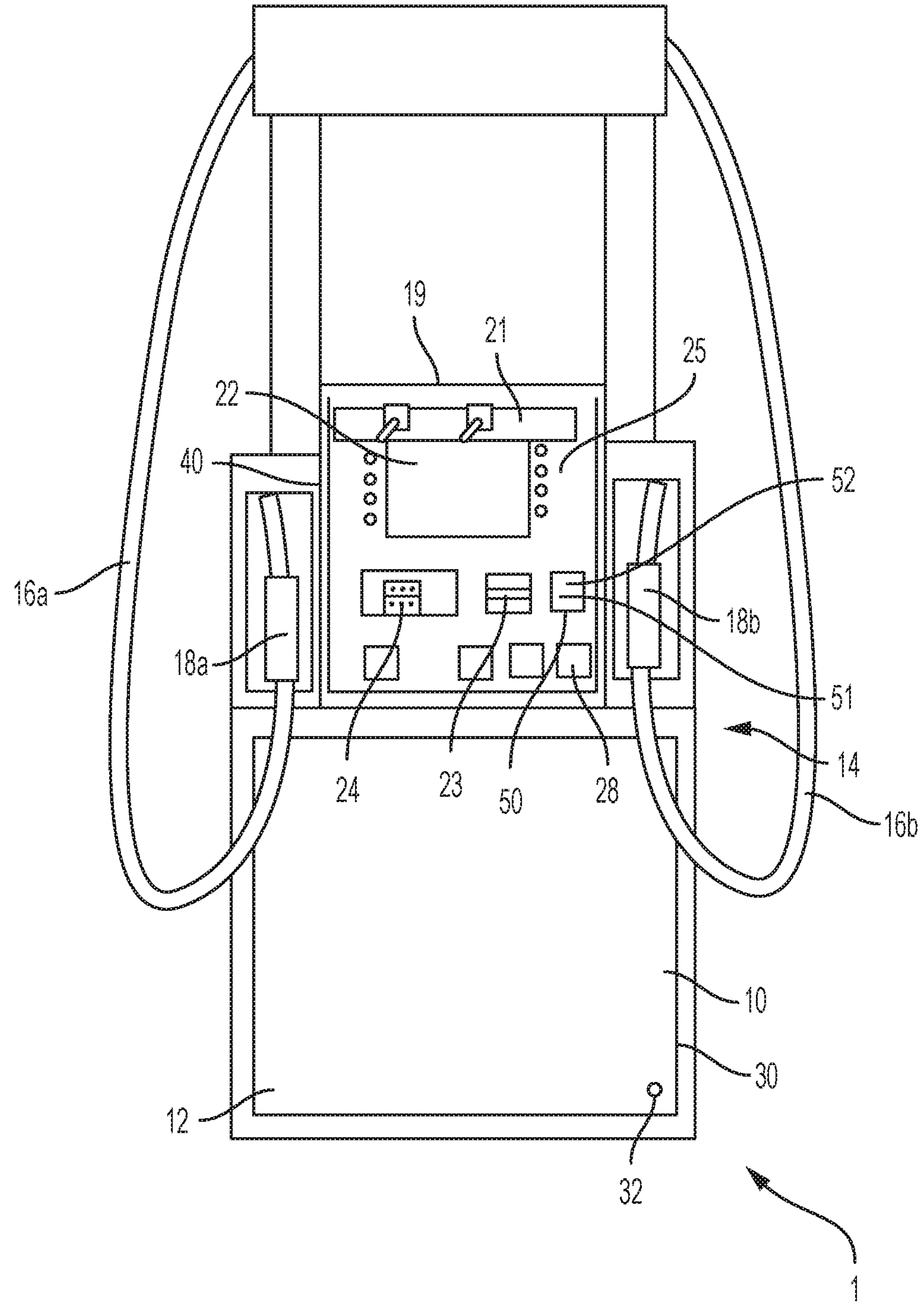
FIG. 1 is a front view of one embodiment of a fuel dispenser.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

In general, a smart door alarm and locking mechanism and methods for use thereof are provided for maintaining security while providing ease of access to a fuel dispenser. In an exemplary embodiment, the methods and devices are used in fuel dispensing devices for providing fuel to a vehicle. However, the methods and devices can be utilized in any device having a payment system where security and access are both required.

In some embodiments, the described methods and systems include a door alarm and door lock kit that allow unlocking of one or more doors in a housing of a fuel dispenser and simultaneously disabling or de-activating respective door alarm sensor(s). In a similar manner, the door can be locked and the door alarm sensor activated or re-activated substantially simultaneously. In an exemplary embodiment, each door in the housing can be coupled to a respective electronic door locking mechanism that is configured to lock and unlock the door to control access to components within the housing of the fuel dispenser. The door alarm sensor can be coupled to an alarm and it can be configured to sense when the door is locked and unlocked. Operation of the door locking mechanism and the door alarm sensor can be controlled by a controller disposed in the housing and coupled to the locking mechanism and the door alarm sensor.

The locking/unlocking of the door and activating/de-activating of the door alarm sensor can be done in response to suitable component(s) of a fuel dispenser receiving appropriate data. For example, the fuel dispenser can include a communication unit, such a reader or other component, that can read, in a contact or non-contact manner, a portable access device to unlock the door and de-activate the alarm sensor. The portable access device can be a card, a mobile phone, or other suitable device. The reader can be at least one biometrics reader configured to acquire biometrics information from a user in a contact or non-contact manner. Depending on the configuration of the reader, a user can swipe the card through a slot in the card reader, bring a card or mobile phone or a similar device in proximity to the reader, or provide biometrics information to thereby unlock the door and de-activate the alarm sensor. Each portable access device can be configured to open only one or more of the doors on the dispenser. Similarly, biometrics information used to authenticate a particular user can be configured to open only one or more of the doors on the dispenser. After the unlocked door is opened and the user performs required manipulations of components of the fuel dispenser that become accessible, the user can use the portable access device again to lock the door and activate or re-activate the door alarm sensor. Furthermore, in some embodiments where a fuel dispenser includes a keypad, user input in the form of a pin code or other data can be received to control locking/unlocking of the door and activating/de-activating of the door alarm sensor. In this way, a user can access components of the fuel dispenser in a secure and simplified manner. Moreover, by combining the door alarm de-activation/re-activation with the locking/unlocking of the door, a number of instances of tamper de-activation can be reduced along with a number of instances where the alarming capability is inactive while the payment terminal is active. This can increase the security and stability of the fuel dispenser while also reducing the number of warranty calls to re-enable tamper tripped devices.

Figure 2:
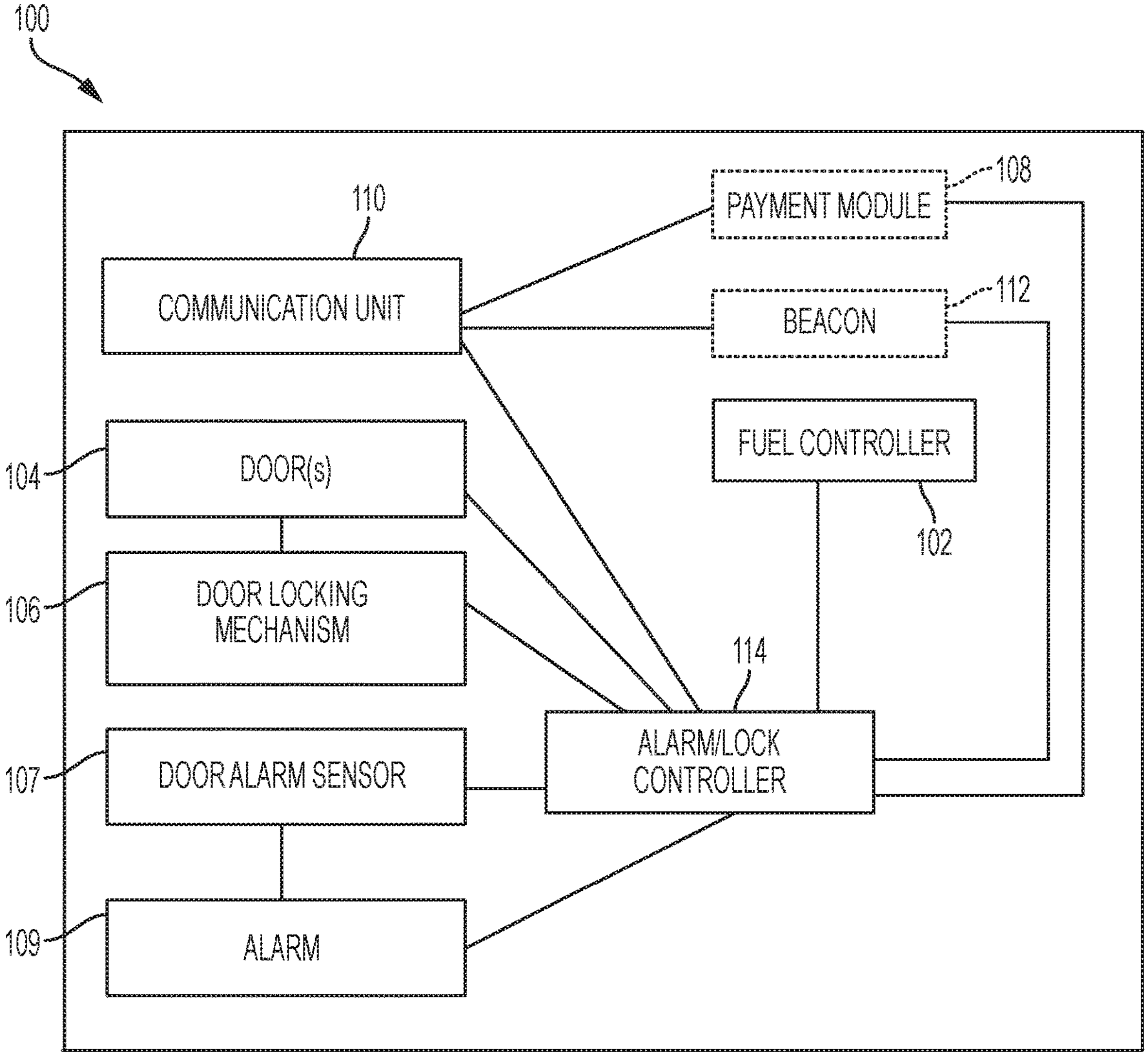
FIG. 2 is a block diagram illustrating components of the fuel dispenser of FIG. 1.

FIGS. 1 and 2 illustrate one embodiment of a fuel dispenser 1 that generally includes a housing 100 having a housing base module 10 and an electronics module 19 (e.g. an "electronic head"), each having a front side 12 and a back side 14. While only the front side 12 is discussed herein, the back side 14 can also have similar features. The fuel dispenser 1 also has two hoses 16*a*, 16*b* on the front side, each having a nozzle 18*a*, 18*b* located at a terminal end of the hose 16*a*, 16*b*. Additional hoses can be present on the back side. A person skilled in the art will appreciate that the fuel dispenser 1 can have any number of hoses that can be coupled to the dispenser in any suitable way(s).

The housing base module 10 can have a variety of configurations and generally includes fuel dispensing components for transportation of fuel to one of more hoses and nozzles. For instance, a "self-contained" fuel dispenser can have an electric motor, a pumping unit, meters, pulsers, and/or valves to physically pump and control a fuel flow. In such an example, the fuel dispenser can use a suction pump. In another example, a submersible pump fuel dispenser can have a pump that is sealed and immersed inside fuel tanks on site. All such variations of fuel dispensing components can be used in the present fuel dispensers. A control system can be disposed in the housing and is coupled to the fuel dispensing components for controlling the delivery of fuel.

The base module 10 can include an outer door 30 that can open to provide access to the fuel dispensing components located inside the base module 10. A locking mechanism 32 is located on the door 30 of the base module 10 for allowing the door to be selectively opened and closed to control access to components within the base module 10, such as meters and other fuel dispensing components, for servicing the fuel dispenser 1. The servicing can be performed by a technician or other person. It should be appreciated that the door 30 is shown schematically, as, in some implementations, the door 30 can be in the form of the entire front side 12 of the base module 10. Also, the locking mechanism 32 and its location on the door 30 are shown schematically, as it can include a latch and/or other components, as discussed below.

The electronics module 19 for facilitating payment for fuel and for facilitating the dispensing of the fuel, with electronics for controlling the fuel dispensing components, can also have a variety of configurations. In general, the electronics module 19 includes a door 40 mounted on the front side of the electronics module 19 and having various components mounted thereon. The door 40 is associated with a respective locking mechanism (not shown) which is typically located on a side of the electronics module 19. The door 40 can have various configurations, and it can be opened/closed in various ways. For example, it can drop down from the top, or it can open from a side to provide access to interior components of the electronics module 19. Other door configurations can be used, as the described techniques are not limited in this respect. The door 40 can be associated with a respective door alarm sensor (not shown in FIG. 1) configured to sense when the door 40 is locked and unlocked, as discussed in more detail below.

The exterior of the door 40 can include various components for allowing for customer interaction with the dispenser. The illustrated electronics module 19 has a price and volume display 21 that presents information concerning the price and volume of any fuel being dispensed, and a graphical display 22 that presents a user interface for displaying information to a customer and/or for interacting with a customer. The illustrated electronics module 19 also has a keypad 24 and buttons 25 that allow a customer to interact with the electronics module 19, a payment/communication unit such as a card reader 23 that allows the customer to pay for purchases, and grade selection buttons 28 that allow the customer to select the grade of fuel to be dispensed by the fuel dispenser 1. The illustrated payment/communication unit is in the form of a card reader 23 configured to read an authorized card in a contact manner (e.g., when the card is swiped through the card reader's slot). In other embodiments, the payment/communication unit can be in the form of a contactless reader such that a card or other access device (e.g., a mobile phone or other mobile terminal) can be brought in proximity to the reader which receives information from the device. Such a contactless reader can be, for example, a near field communication (NFC) reader. In other embodiments, the payment/communication unit can be or can include a biometrics reader configured to acquire one or more types of biometrics information from a user.

Furthermore, as shown in FIG. 1, the electronics module 19 includes a printer 51 coupled to the controller for printing transaction information, unrelated fuel purchase information, map data, driving directions, etc. Access to the printer 51 can be controlled by a door 50 associated with a door locking mechanism 52. The door 50 can be used to access and change paper used by the printer 51, and/or to perform other printer servicing operations. The door 50 can be associated with a respective door alarm sensor (not shown in FIG. 1) configured to sense when the door 50 is locked and unlocked, as discussed in more detail below. It should be appreciated that some fuel dispensers implementing the described techniques may not include components related to payment, such that no payment for fuel can be done at the fuel dispenser side and the payment can be processed, for example, in an in-store Point of Sale (POS) terminal.

As schematically illustrated in FIG. 2, the internal components of the electronics module 19 can include a fuel controller 102 (in the form of a circuit board and processor) for controlling components in the housing base module 10, such as the meters, pumps, and other components for dispensing of fuel. The electronics module 19 can also include a payment controller or module 108 (in the form of a circuit board and processor) for controlling components of the electronics module 19 related to receiving and processing payment, such as card reader(s) and cash acceptors, communication mechanisms for communicating payment data and other information, etc. The fuel controller 102 and payment controller 108 can communicate with one another, directly or indirectly via other components.

Furthermore, in some embodiments, the fuel dispenser 1 can include a communication module 112, also referred to herein as a "beacon," that is configured to be installed on a board in the fuel dispenser and to electronically communicate with a network cloud to access cloud technology services. The beacon 112, which includes one or more wireless communication links configured to facilitate wireless communication between the fuel dispenser 1 and a network cloud, is not described in detail herein. The beacon can be implemented, for example, as described in U.S. patent application Ser. No. 15/182,201 entitled "Methods and Devices for Fuel Dispenser Electronic Communication" filed on Jun. 14, 2016, which is hereby incorporated by reference herein in its entirety.

The beacon 112 can be associated with a fuel dispenser having a payment mechanism (e.g., fuel dispenser 1 in FIG. 1), or it can be associated with a fuel dispenser that lacks such payment mechanism. The beacon 112 can also authorize information received from the access device. In embodiments in which the fuel dispenser includes a payment mechanism, a payment module can authorize information received from the access device.

The fuel dispenser 1 can include a communication unit 110 configured to communicate in a contact manner or a non-contact manner with a card, mobile phone, or other access device. In some embodiment, the communication unit 110 is configured to communicate with at least one biometrics reader. The communication unit 110 can be in communication with an alarm/lock controller 114 for locking/unlocking one or more doors (e.g., doors 30, 40, 50), as discussed further below.

It should be appreciated that, while only one fuel dispenser 1 is shown in FIG. 1, one or more fuel dispensers 1 can be grouped together in a single location. Additionally, the fuel dispenser 1 can contain more than one hose and nozzle combination. For example, two, four, or eight hoses and two, four, or eight nozzles can be provided for use on the front side 12 of the housing base 10 while two, four, or eight hoses and two, four, or eight nozzles can be provided for use on the back side 14. A person skilled in the art will further appreciate that the fuel dispenser can have a variety of configurations and the illustrated dispenser configuration is merely representative of one type of fuel dispenser.

As indicated above, a fuel dispenser can be manufactured with or can be retrofit with components that allow for simultaneous door locking/unlocking and alarm disabling/enabling. As shown in FIG. 2, which illustrates schematically some of the components of a fuel dispenser 100 that implement the described techniques, the fuel dispenser can include at least one door 104 that is coupled to the housing 100 and that is associated with a door locking mechanism 106 configured to lock and unlock the door to control access to components within the housing 100. The door 104 can be any number of doors on a fuel dispenser, such as base module door 30, electronics module door 40, and printer door 50 of FIG. 1. As shown in FIG. 2, the door locking mechanism 106 can be associated with a respective door alarm sensor 107 configured to sense when the door 104 is locked and unlocked, as discussed in more detail below. The door alarm sensor 107 can detect when the door 104 has been tempered with and can emit an alarm signal. In the illustrated embodiment, the fuel dispenser 1 includes at least one alarm 109 coupled to the door alarm sensor 107 and configured emit a suitable signal (visual, audio, visual/audio, any combination thereof) when the door alarm sensor 107 senses that the door 104 has been opened without authorization.

As mentioned above, the at least one door 104 can be one or more doors 104 protecting access to various components of the fuel dispenser, and each of the doors 104 can be associated with a respective locking mechanism 106 and door alarm sensor 107. Thus, as mentioned above, each of the doors 30, 40, 50 is associated with respective locking mechanism and respective door alarm sensors.

Operation of the locking mechanism 106 and the door alarm sensor 107 can be controlled by an alarm/lock controller. FIG. 2 illustrates such an alarm/lock controller 114 disposed in the housing 100 and coupled to the locking mechanism 106 and the door alarm sensor 107. In some embodiments, the door locking mechanism 106, the door alarm sensor 107, and the alarm/lock controller 114 can be built into a fuel dispenser (e.g., fuel dispenser 1). Alternatively, a kit including the door locking mechanism 106, the door alarm sensor 107, and the alarm/lock controller 114 can be provided that can be incorporated into any existing fuel dispenser.

Figure 3:
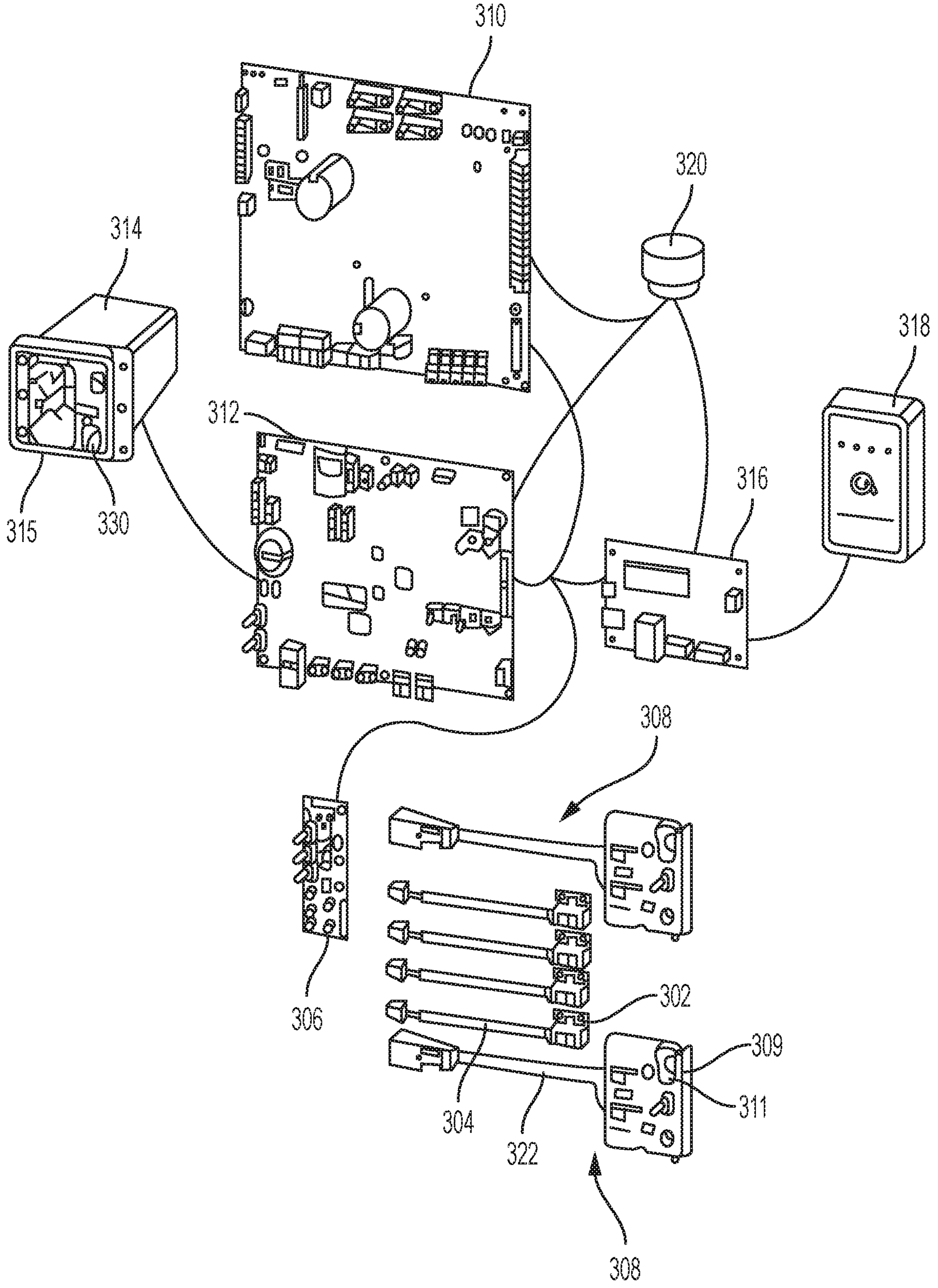
FIG. 3 is a perspective view illustrating one embodiment of components of a fuel dispenser door lock and alarm kit.

FIG. 3 illustrates one embodiment of fuel dispenser components that can be used to implement the described techniques. A person skilled in the art will appreciate that any combination of the illustrated components can be used, and not all components are required. FIG. 3 shows four door alarm sensors 302 each configured to couple via a cable 304 to an alarm/lock controller 306; two door locking mechanisms 308 each configured to lock a door; a fuel controller 310 for controlling the fuel dispensing components in the base module; a payment controller 312 for receiving payment and for communicating with the fuel controller 310 to allow the dispensing of fuel when payment is received; two readers, one being a contact reader 314 configured to read information from a portable access device put into contact with the reader 314, and the other being a contactless reader 318 configured to read information from a portable access device held in proximity to the reader 318; a communication module or beacon 316 configured to wirelessly communicate with a network cloud; and an alarm mechanism 320 configured to emit a signal. The components can be implemented using suitable circuity. It should be appreciated that connections between these components are shown schematically and that not all connections are shown. The wired connections between the components shown herein and other components of the fuel dispenser can be implemented via a suitable number of wires, such as via a controller area network bus (CAN Bus) wire connection, an RS485 wire connection, a current loop connection, or other type of wire connection.

A door alarm sensor (e.g., door alarm sensor 107 in FIG. 2 and door alarm sensors 302 of FIG. 3), can have a variety of different configurations. In some embodiments, the door alarm sensor can be a magnetic sensor, as in FIG. 3 in which each of the door alarm sensors 302 of FIG. 3 can be magnetic sensors, and the fuel dispenser can include a magnet associated with the magnetic sensor and configured to be mounted on a door. For ease of discussion, one of the door alarm sensors 302 is discussed below with respect to the door associated therewith and with respect to the magnet associated therewith. The magnet can be coupled to the door in any suitable manner. The door alarm sensor 302 can be mounted inside the dispenser in a suitable location, such as on a center panel location in an electronics module of the fuel dispenser that separates front and back sides of the dispenser. The door alarm sensor 302 can be coupled, e.g., via the cable 304, to the alarm/lock controller 306 that controls activation and de-activation of the sensor 302. The door alarm sensor 302 can sense when the magnet is disengaged therefrom and thus detect that the door has been opened.

The door locking mechanism 308 associated with one or more doors (e.g., doors 30, 40, 50 in FIG. 1) can also have a variety of different configurations. As shown in FIG. 3, the door locking mechanism 308 can include an electronic latch assembly 309 that is mounted inside the fuel dispenser, e.g., to the center panel in the electronics module. The electronic latch assembly 309 can include a cable 322 that connects the electronic latch assembly 309 to the alarm/lock controller 306. A fuel dispenser can be manufactured with the electronic latch assembly 309 (or a similar locking mechanism), or the electronic latch assembly 309 (or a similar locking mechanism) can be used to replace a manual lock present on an existing fuel dispenser. Electronics in the latch assembly 309 are configured to control opening and closing of a latch 311. The latch 311 engages a suitable feature on the door (e.g., a hoop or other feature configured to be lockingly engaged by the latch 311). When the latch 311 is disengaged, the door can be opened. When the latch 311 is engaged, the door is prevented from being opened. The door to which the door locking mechanism 308 is coupled can be opened and closed by a user, whereas locking and unlocking of the door can be done electronically, as described herein.

The alarm/lock controller 306 can also have a variety of different configurations. As shown in FIG. 3, the alarm/lock controller 306 can be implemented as a circuit board mounted inside the fuel dispenser, e.g., in the electronics module. The alarm/lock controller 306 can be included in a fuel dispenser as manufactured, or it can be added after-market to an existing fuel dispenser. As discussed above, the alarm/lock controller 306 is coupled to both the door alarm sensor 302 and the door locking mechanism 308 (e.g., via a universal serial bus (USB) cable or using other connector(s)) to allow the alarm/lock controller 306 to control operation of these components. Regardless of the number of door alarm sensors 302 and door locking mechanisms 308 present in a fuel dispenser, the alarm/lock controller 306 is coupled to each of these components.

As shown in FIG. 3, the alarm/lock controller 306 is connected to the fuel controller 310, either directly or via the payment controller 312. Thus, the alarm/lock controller 306 can instruct the fuel controller 310 to disable fuel dispensing and other operations of the fuel dispenser when the latch 311 is disengaged (and hence when the door is open) and/or when the door alarm sensor 302 senses unauthorized opening of the door. The alarm/lock controller 306 can also be connected to the payment controller 312 and/or the beacon 316. When both the payment controller 312 and the beacon 316 are present, the alarm/lock controller 306 is coupled to each of them.

Regardless of its specific configuration, the alarm/lock controller 306 receives signals from the door alarm sensors 302 indicating a current state of the doors respectively associated with the sensors 302. If a door is opened without proper authorization, an alarm is triggered. For example, the alarm 320 can generate a suitable signal that can be provided via the fuel dispenser (e.g., an alarm will sound) and/or a notification can be sent to a remote controller. The alarm/lock controller 306 is also configured to send instructions to the door locking mechanism to cause the latch 311 to open and close.

As mentioned above, a fuel dispenser can include one or more readers for obtaining information from a portable access device, such as a card, a mobile phone, and/or other access devices. The reader(s) can have a variety of different configurations. For example, the reader can be a contact reader or a contactless reader. The reader can be operatively coupled to either or both of the beacon 316 and the payment controller 312. In some cases, a contactless card reader can be coupled to the beacon 316, and a contact card reader can be coupled to the payment controller 312, as shown in FIG. 3. The secure card reader 314 can be a card reader present in the fuel dispenser and used for receiving credit card payments.

The reader can be configured to read information from a portable access device, such as a card advanced into the card reader 314, and the acquired information can then be provided to a suitable component of the fuel dispenser, such as the beacon 316, payment controller 312, or other suitable component configured to authenticate information read from the card 330. In particular, a user can swipe the card 300 through a slot in the contact reader 314 such that the card reader 314 reads information stored in the card 300. The contactless card reader 318, which can be disposed at any suitable location on the fuel dispenser (e.g., on the front side of the electronics head), can read information from a suitable access device in a non-contact manner. For example, the user can tap the access device or bring it in proximity to the card reader 318.

The fuel dispenser can authenticate or validate the information obtained from the access device using any suitable security protocol, such as a public/private key protocol. The access device can have information stored thereon that can be decrypted and used to lock/unlock the door and activate/de-activate the alarm sensor 302 associated with the door. The access device can have the access code (e.g., a private key or the like) stored thereon in a secure manner that can be authenticated or validated by the fuel dispenser using information (e.g., a public key or the like) stored on the dispenser. For example, the fuel dispenser can store in a memory thereof computer-executable instructions that, when executed by a processor (e.g., a payment module's processor or other processor), can perform access device authentication or validation.

The access device can store an access code, user identification information identifying at least a user and a level of the user, date/time information indicating date/time of creation of the access code, and any other suitable information. The date/time of creation of the access code can be used to determine when that information is to be erased and replaced with new information. The level of the user, which can be encoded on the card or other access device as part of the key stored on the card or other access device, is used to determine which components can be accessed using the card or other access device. Thus, a card or other access device can be configured to unlock and lock one or more doors, depending on a level of the user. For example, a card or other access device can allow controlling a door and a respective alarm to control access to a base module of a fuel dispenser's housing, an electronics heard, and a printer. Thus, a service person can use such card or other access device to service the dispenser. As another example, a card or other access device can allow controlling a door and a respective alarm to control access only to a printer or to the electronics module and the printer. For example, a store clerk can use a card or other access device that allows to only accessing a printer door. A fuel dispenser can have various doors that can be locked and unlocked while respective alarm sensors are activated/de-activated using cards or other access devices having a desired level of user access.

In some embodiments, a public key can be installed on a fuel dispenser for availability to locking and alarming software installed on the fuel dispenser (e.g., software stored in a payment module, beacon, or other component(s)). The software, when executed by a processor, can use the public key to determine the legitimacy of a user attempting to access the dispenser. To validate access, the user can use a card or other access device that is read either via a contact reader or a contactless reader installed in the dispenser. For dispensers without a payment module, a separate non-payment contactless reader can be installed with appropriate software. The software can be executed by a processor to validate the legitimacy of the card through the date and access code encrypted on the card passed to the software from the reader.

The card or other access device can be created in a Network Operating Center (NOC) or by an Authorized Service Agent or can be electronically updated with an access code (e.g., via an application (app) installed on the access device). In both cases, the access code (e.g., a private key) can be generated by using a single use password. The first use of a newly generated key can automatically disable all previously generated keys. Because the key has a date associated with it, if another key was generated with a previous date but was not used, that previously generated key becomes invalid.

The card or other access device, whether magnetic strip or NFC, can contain multiple tracks of data which have information about the user of the card, the expiration date of the card, the user's level of authorization and some challenge codes which are encrypted using a public-private key encryption pair. When the card is read by the dispenser components, the track data is compared to information which has been downloaded to the dispenser components informing the components of which track should contain a certain key. The challenge track being read will change upon every instance of reading the challenge codes to ensure that the card has not been partially duplicated. All attempts to access a dispenser will be logged both locally and in a server instance to quickly identify attempts to access the dispenser by a user.

In some embodiments, an access code can be received by the fuel dispenser based on user input received via a secure pin pad. The pin pad can be used additionally or alternatively to card readers. The pin pad can be an existing keyboard of the fuel dispenser or an otherwise configured pin pad.

In use, after a user swipes, taps, or otherwise uses a card or other access device such that it is read by a reader, a respective locking mechanism is unlocked and the door alarm sensor is de-activated. A suitable component of the fuel dispenser, e.g., a payment terminal, can then present on a suitable display an indication indicating that the door alarm sensor has been de-activated. The fuel dispenser and payment module (if present) can be de-activated while the door alarm sensor remains inactivated. The indication can be a light, a change of light, a textual message, an audio message, and/or other type of indication. After a door to having the locking mechanism is opened and desired operations are performed (e.g., a store clerk opens a printer door and replaces the paper, a service person services the dispenser, etc.), the door can be locked again. When it is detected (e.g., by the door alarm sensor) that the door has been closed again, the indication will continue to be displayed, indicating the door alarm is not activated. After the user swipes or otherwise uses the card a second time, the door alarm is re-activated and the door is locked. If the payment terminal was disabled, it can then be re-started.

The alarm 320, such as a buzzer or other mechanism, can be mounted in any suitable location on or in the dispenser. The alarm 320 can be connected to battery backup. The alarm 320 can be activated by alarm/lock controller when the door is opened without authorization.

Figure 4B:
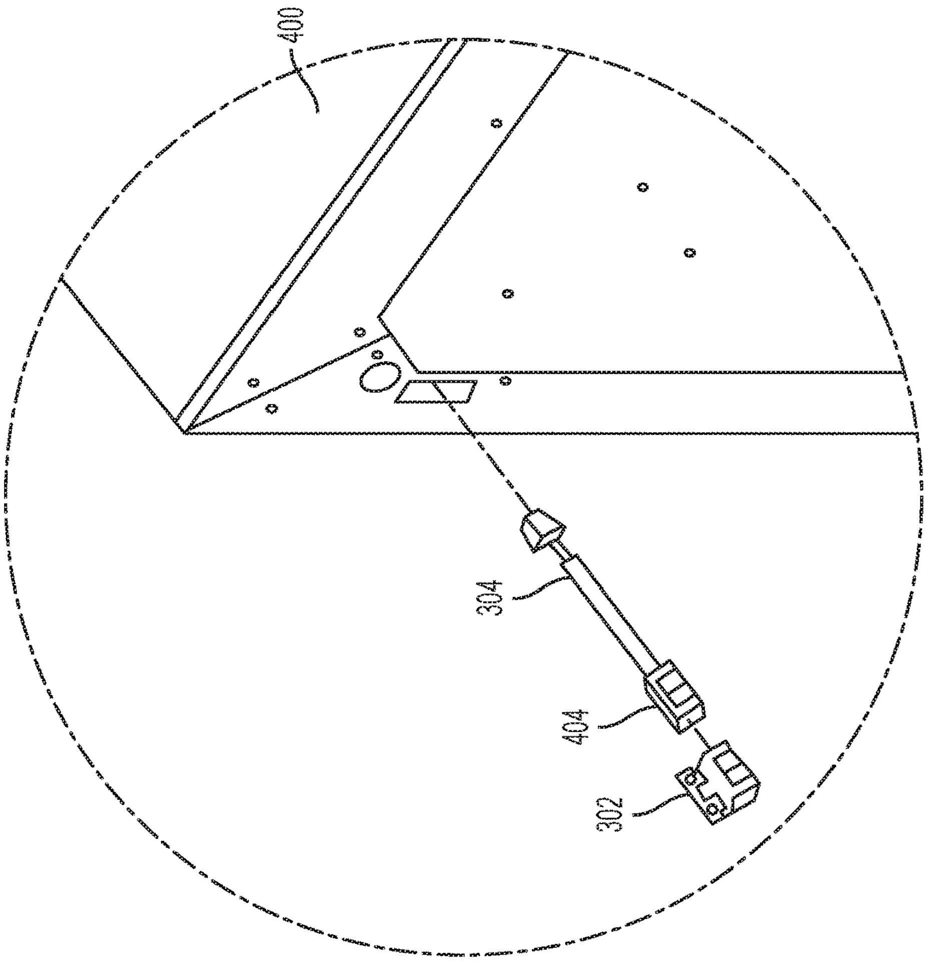
FIG. 4B is a perspective view of a portion of the frame of FIG. 4A showing a door alarm sensor for mounting to the frame.
Figure 4A:
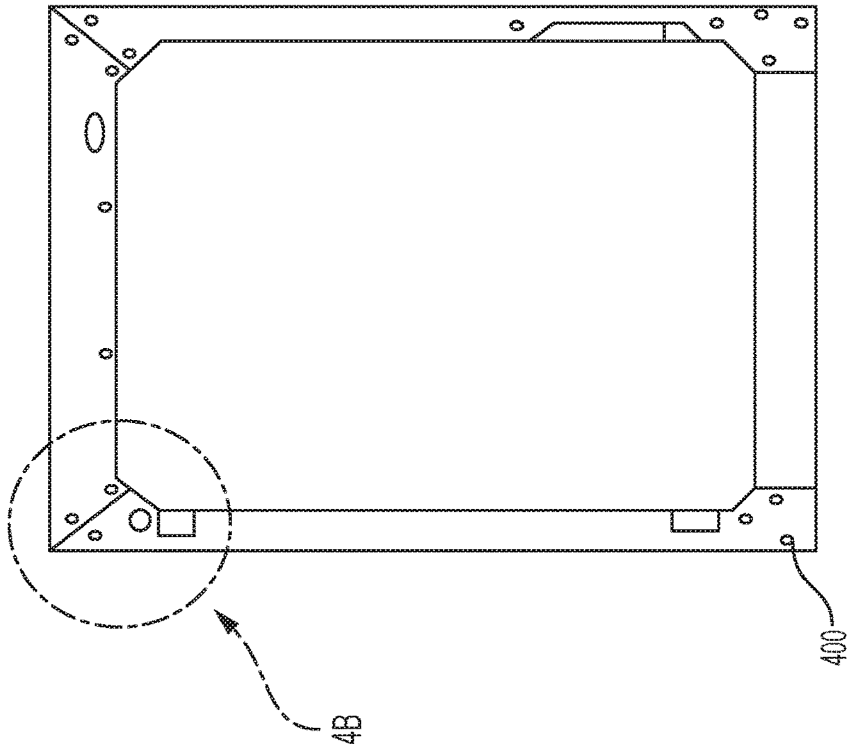
FIG. 4A is a front view of a frame of a fuel dispenser.
Figure 4D:
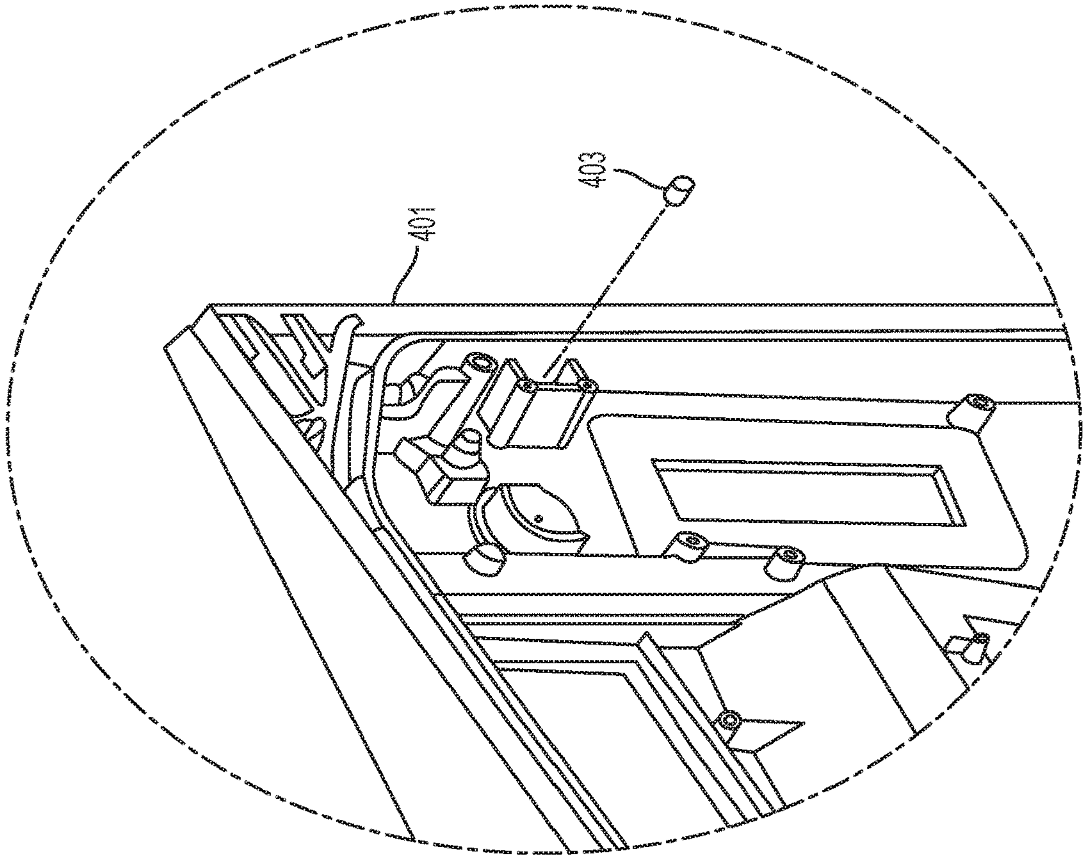
FIG. 4D is a perspective view of a portion of the door of FIG. 4C showing a magnet for mounting to the door.
Figure 4C:
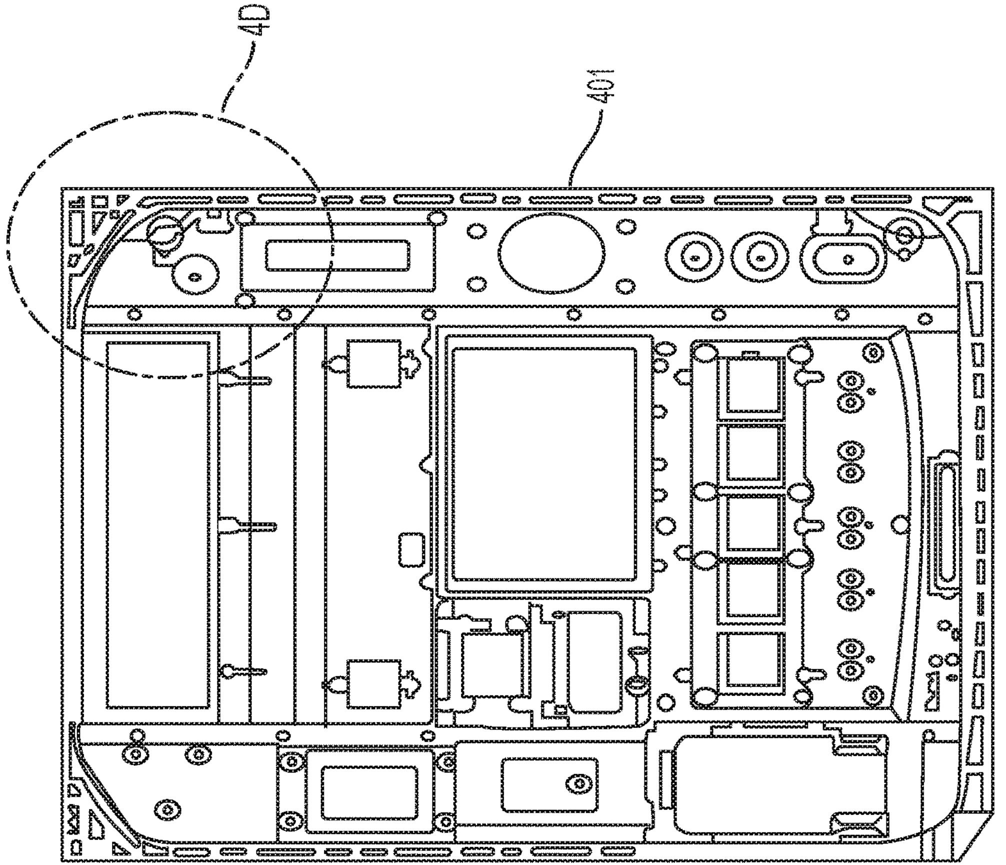
FIG. 4C is a rear view of an electronics module door of a fuel dispenser.

FIGS. 4A-4D illustrate one embodiment of a frame 400 of a fuel dispenser configured to be mounted within the fuel dispenser and to have a door 401 hingedly attached thereto. The door alarm sensor 302 of FIG. 3 is configured to be attached to the frame 400, and a magnet 403 is configured to be attached to the door 401 and to magnetically communicate with the sensor 302. FIGS. 4A and 4B show a front side of the frame 400, and FIGS. 4C and 4D show a back (internal) side of the door 401. The frame 400, the door 401, the sensor 302 and the magnet 403 can each have any of a variety of configurations, as will be appreciated by a person skilled in the art. The door alarm sensor 302 can be attached to the door 400 in any of a variety of different ways. The door 400 in this illustrated embodiment includes a cavity formed therein in which the sensor 302 can be disposed, as shown in FIG. 4B. The cable 304 has a connector 404 on a terminal end thereof for coupling to the sensor 302, and the cable 304 can extend out the back side of the door 400 to extend into the fuel dispenser and couple to an alarm/lock controller, as discussed herein.

Figure 4F:
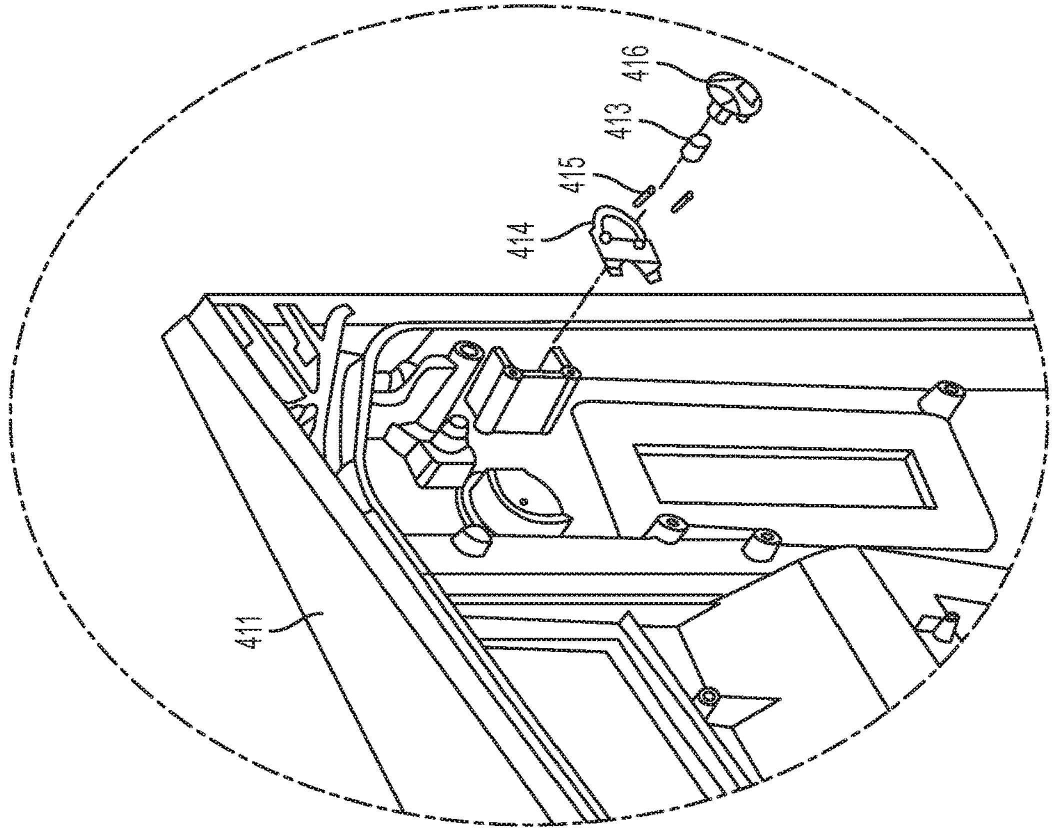
FIG. 4F is a perspective view of a portion of the door of FIG. 4E showing a magnet for mounting to the door.
Figure 4E:
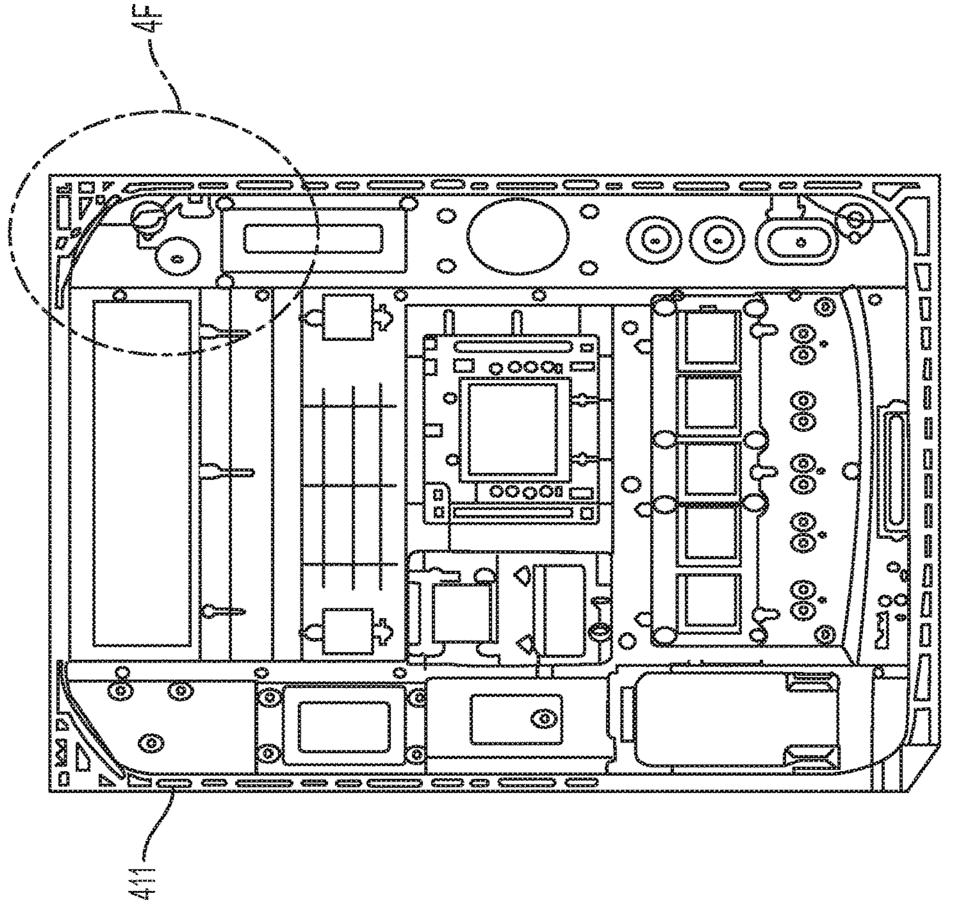
FIG. 4E is a rear view of an electronics door of a fuel dispenser.

FIGS. 4E-4F illustrate another embodiment of a door 411 showing a magnet 413 configured to be mounted on the door 411. Various mounting components are shown for securing the magnet 413 to the door. In particular, a support 414 is shown having a recess that seats the magnet 413 and two screws 415 are shown for securing the support 414 to the door 411. A cover 416 is also provided for holding the magnet in the correct location so that the sensor can detect the magnetic pull of the closed door.

Figure 5:
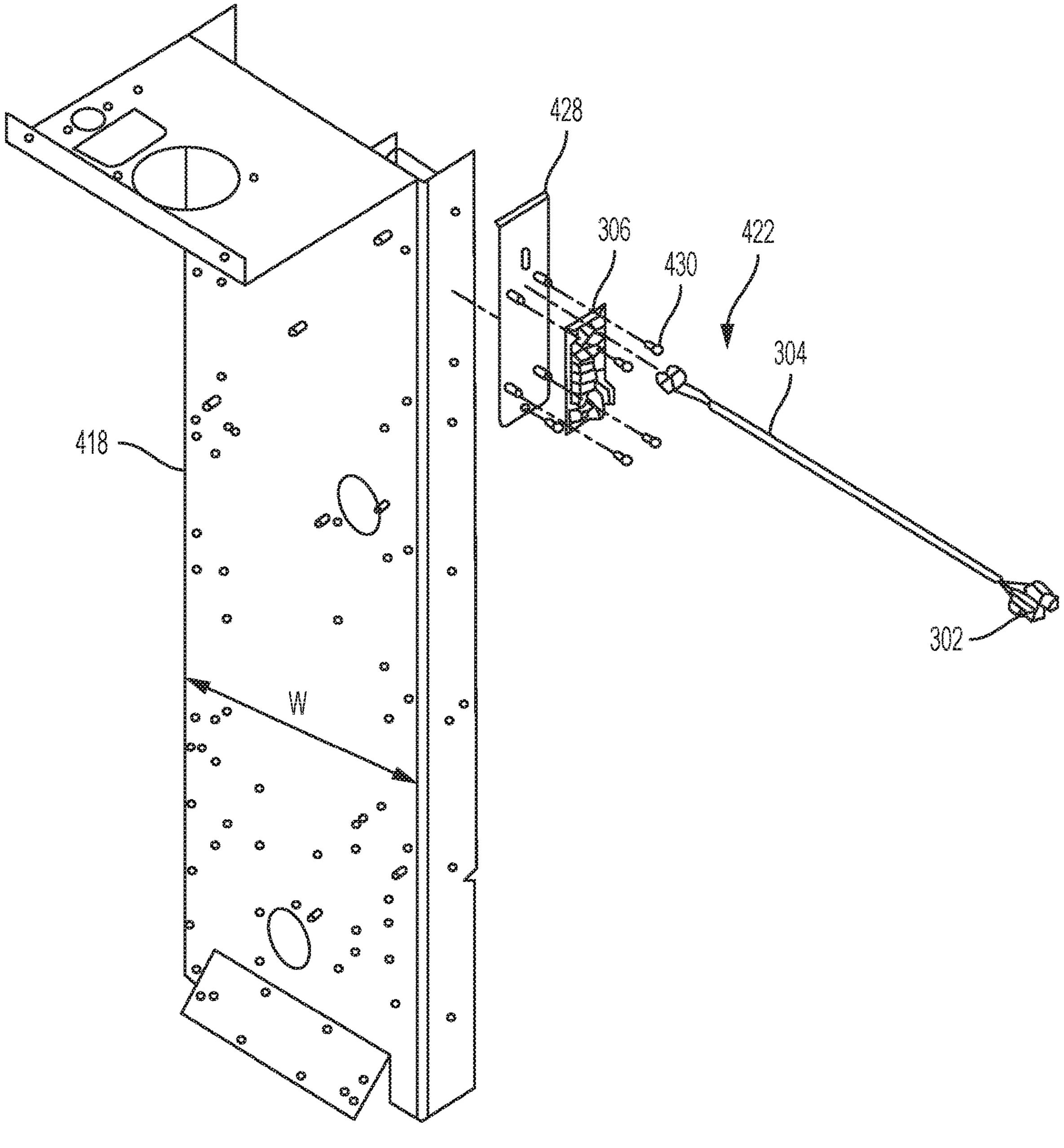
FIG. 5 is a perspective view of an interior center panel of a fuel dispenser showing an alarm/lock controller and a door sensor for mounting to the center panel.

FIG. 5 illustrates a fuel dispenser center panel 418 configured to be mounted within the electronics module, e.g., between front and back sides of the fuel dispenser and extending left to right. The panel's left to right width W is less than a left to right width of the fuel dispenser. FIG. 5 also the door alarm sensor 302 having a cable 304 configured to attach to the alarm/lock controller 306 at a first end 422 thereof and to the sensor 302 at the second end thereof. The sensor 302 can be mounted in a cavity in the door 411, as explained above with respect to FIGS. 4C-4F. A mounting plate 428 and connectors 430 (e.g., screws) can be used to facilitate attachment of the alarm/lock controller 306 to the center panel 418.

Figure 6:
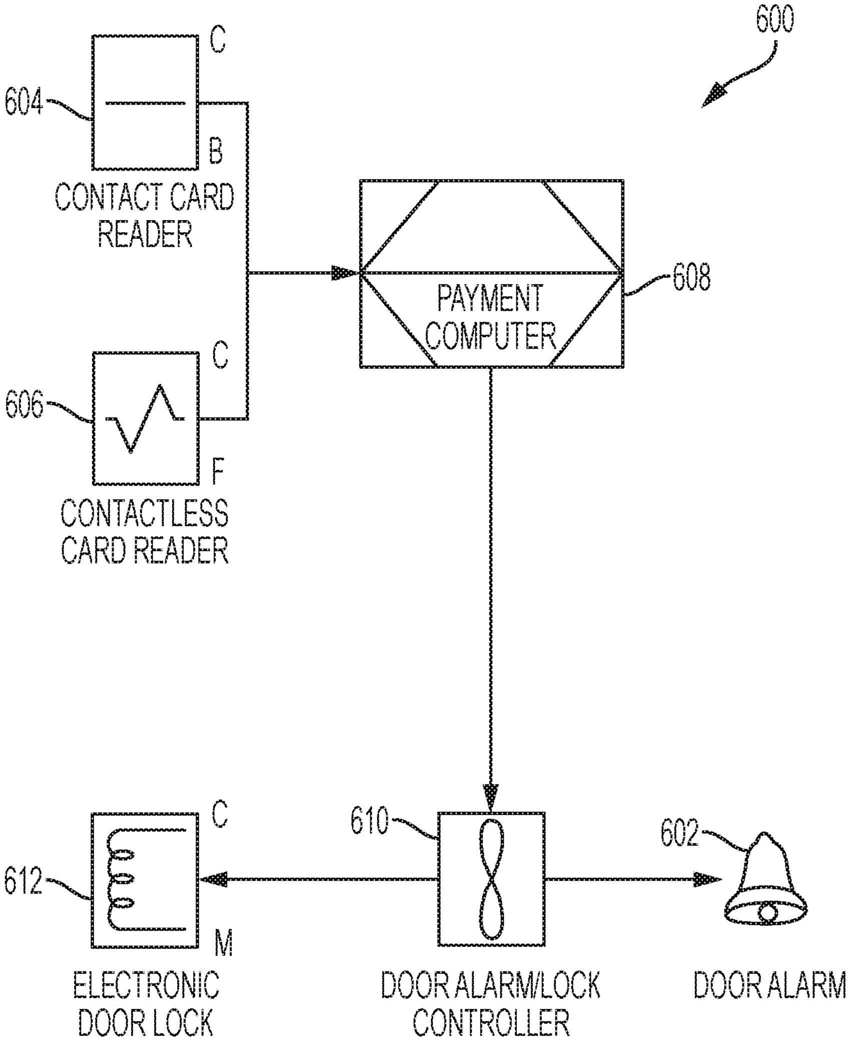
FIG. 6 is a schematic view of one embodiment of components of a fuel dispenser including a door alarm and door lock kit.

FIG. 6 illustrates one embodiment of components of a fuel dispenser 600 including a door alarm 602, which is a mechanism to emit an audible sound in this illustrated embodiment. The fuel dispenser 600 also includes first and second readers in the form of a contact card reader 604 and a contactless reader 606. The contact reader 604 is configured to communicate data to a payment controller 608 in response to an access device contacting the contact reader 604, and the contactless reader 606 is configured to communicate data to the payment controller 608 in response to an access device coming within an effective distance of the contactless reader 606. The payment controller 608 is in the form of a computer that is configured to validate or authenticate the access device based on the data received from the one of the readers that read the access device and communicated data related to the attempted validation or authentication to the payment controller 608. The payment controller 608 is configured to transmit data indicative of validation of authentication of the access device to an alarm/lock controller 610, which is configured to cause an electronic door lock 612 to unlock in response to a received indication of successful access device validation or authentication to allow access into the fuel controller via the unlocked door and to cause the door alarm 610 to provide an alarm in response to a received indication of failed access device validation or authentication to indicate a potentially problematic attempt for access into the fuel dispenser 600 via the door.

Figure 7:
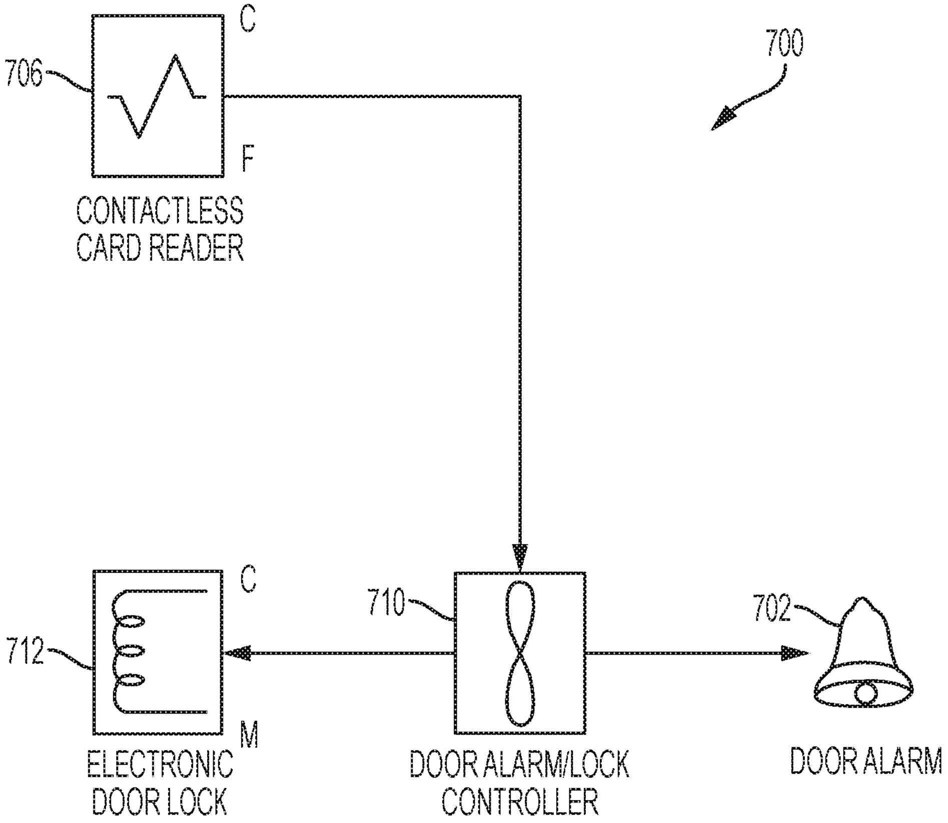
FIG. 7 is a schematic view of another embodiment of components of a fuel dispenser including a door alarm and door lock kit.

FIG. 7 illustrates another embodiment of components of a fuel dispenser 700 including a door alarm 702, which is a mechanism to emit an audible sound in this illustrated embodiment. The system of FIG. 7 is similar to the system of FIG. 6 except that the fuel dispenser of FIG. 7 does not include a payment controller and does not include a contact reader. The contactless reader 706 of FIG. 7 is configured to validate or authenticate the access device based on the data read from an access device and is configured to communicate data related to the attempted validation or authentication to the alarm/lock controller 710. The alarm/lock controller 710, which is configured to cause the electronic door lock 712 to unlock in response to a received indication of successful access device validation or authentication to allow access into the fuel controller via the unlocked door and to cause the door alarm 702 to provide an alarm in response to a received indication of failed access device validation or authentication to indicate a potentially problematic attempt for access into the fuel dispenser 700 via the door.

As mentioned above, a fuel dispenser implementing the described techniques can include a beacon and/or a payment module. In some embodiments, a beacon is present and a payment module is absent. In other embodiments, a payment module is present and the beacon is absent. In yet other embodiments, both beacon and payment module are present.

FIGS. 8-13 illustrate examples of fuel dispensers and processes in accordance with the described techniques implemented using the dispensers. Regardless of the configuration of the fuel dispenser, when the door is unlocked and the door alarm sensor is de-activated, the fuel controller de-activates fueling components such that fueling cannot be performed. After the door has been locked and the door alarm sensor is activated (or re-activated), the fueling components are activated and the fuel dispenser can be used to pump fuel. It should be appreciated that only some components of the fuel dispensers are shown in FIGS. 8-13.

Figure 8:
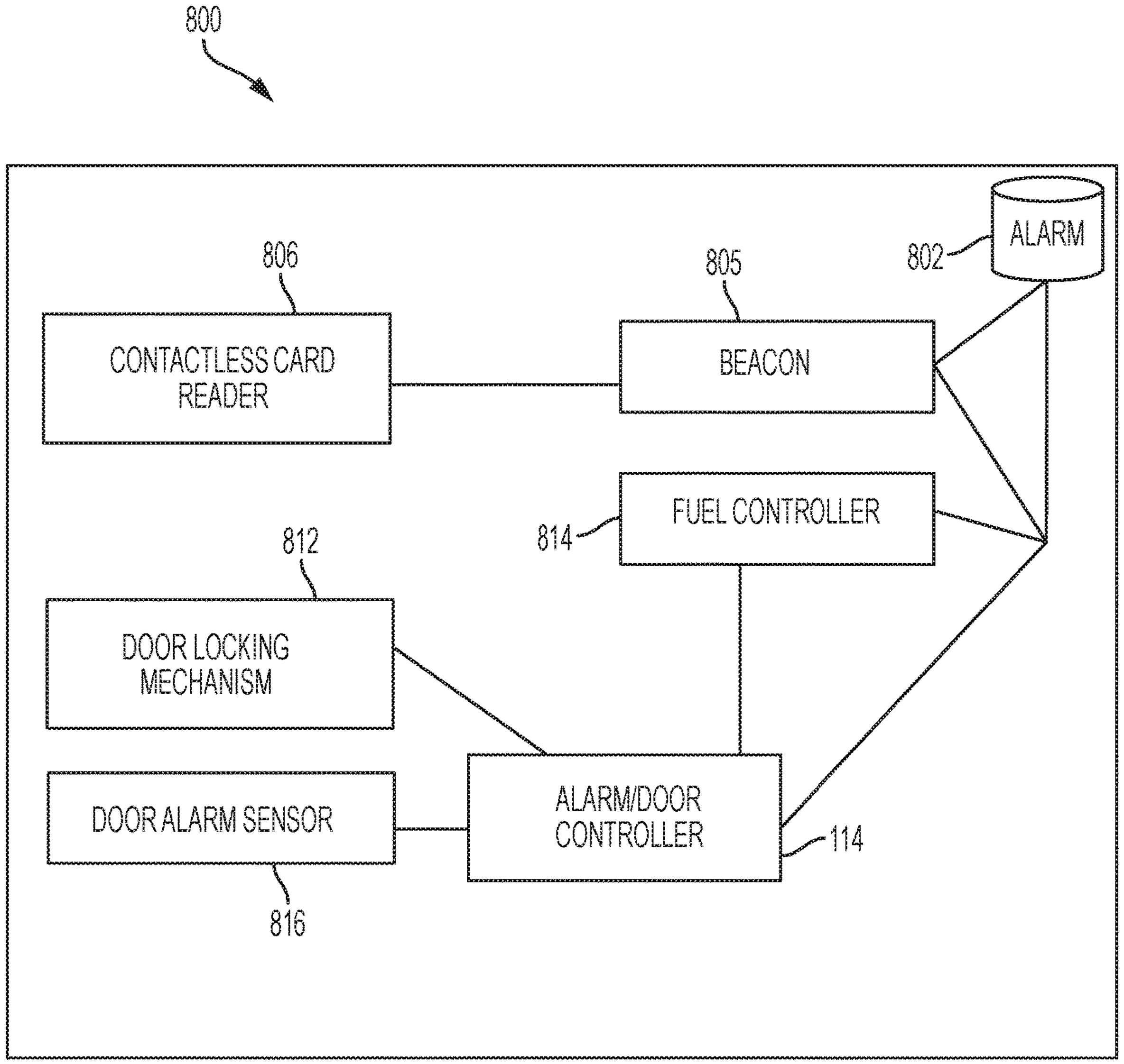
FIG. 8 is a block diagram illustrating components of one embodiment of a fuel dispenser having a beacon and not including a payment controller.

FIG. 8 illustrates one embodiment of a fuel dispenser that includes a beacon (e.g., beacon 112 in FIG. 2) and that does not include a payment module. As shown, the fuel dispenser 800 includes a contactless reader (e.g., a near field communication ("NFC") reader) 806, a beacon 805, a fuel controller 814, a door locking mechanism 812, a door alarm sensor 816, an alarm 802, and an alarm/lock controller 810.

Figure 9:
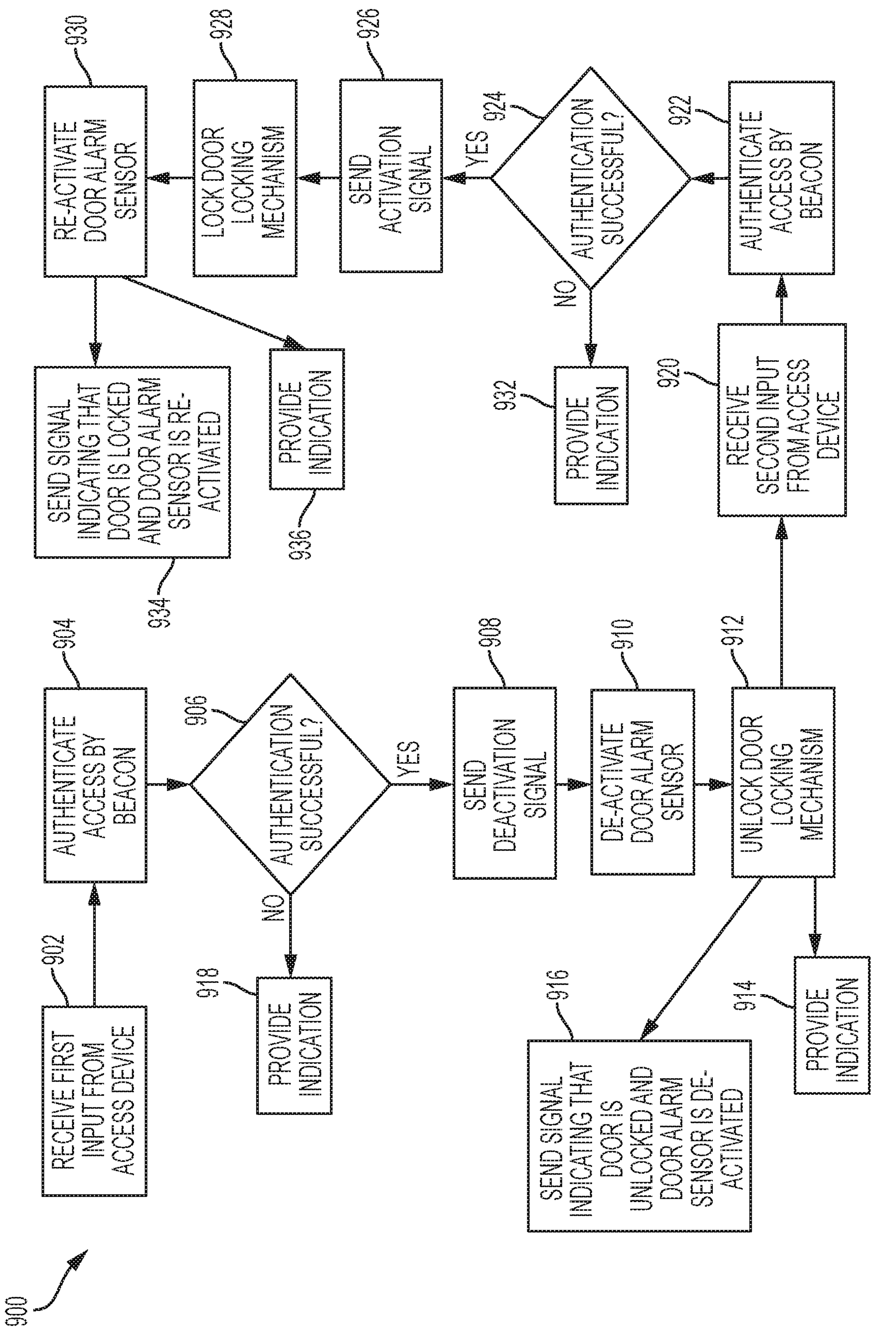
FIG. 9 is a flowchart illustrating a process of operating the fuel dispenser of FIG. 8.

FIG. 9 illustrates a flow process for the fuel dispenser 800 of FIG. 8. As shown, a first input can be received (902) from a portable access device. For example, a user can position a card, mobile phone, or other portable device adjacent to the contactless reader. The beacon can authenticate (904) the information acquired from the portable access device (user information, user level, secure access code, date/time of secure access code creation, etc.). For example, the beacon can communicate wirelessly with the network cloud, which can compare the received data to stored data to verify the accuracy of the data. If the authentication (906) is successful, the beacon can send a deactivation signal to the alarm/lock controller (908), which in turn can cause the door alarm sensor to be de-activated (910) and can cause the door locking mechanism to switch from the locked configuration to the unlocked configuration (912). Based on a level of the user, one or more doors can be thus unlocked. For example, if the user is a service person with a portable device that provides access to all doors, including the base module door, the electronics module door, and the printer door, the locking mechanism for each door can unlock. As another example, if the user is a cashier, a clerk, or other person authorized to access only some components of the fuel dispenser, such as the printer door, the alarm/lock controller will instruct only the electronic door locking mechanism on the printer door to unlock. As mentioned above, the portable access device includes information on what door(s) can be unlocked using this card. It should be appreciated that the door alarm sensor can be de-activated and the door locking mechanism can be unlocked in any order or substantially simultaneously.

When the door alarm sensor is de-activated (910) and the door locking mechanism is unlocked (912), a respective indication can be provided (914) to a user. For example, a button on the electronics module can light up, a color of a light indicator can change (e.g., from green to red), or any other indication can be provided to the user indicating that the alarm has been de-activated. As shown, the beacon can send a signal (916) to a remote system (e.g., to a POS system, network cloud, or any other remote controller) indicating that the door alarm sensor is de-activated and the door locking mechanism is unlocked.

If the authentication (906) is not successful, a corresponding indication can be provided (918) to the user. For example, a graphical display of the fuel dispenser can provide a message indicating that the access device has not been authenticated properly. In some cases, additionally or alternatively, the fuel dispenser can include an additional display configured to display messages related to accessing the fuel dispenser using the described techniques.

After the user opens the unlocked door and performs required operations on components that thus become accessible, the door can be closed. A suitable component of the fuel dispenser, such as the door alarm sensor, can detect that the door has been closed. A second input can then be received (920) from the portable access device, e.g., when the user again brings the device in proximity to the reader. The beacon then performs another authentication (922) of the information provided by the portable access device. If the authentication (924) is successful, the beacon sends an activation signal (926) to the alarm/lock controller, in response to which the alarm/lock controller causes the door alarm sensor to be activated (930) and the door locking mechanism to be locked (928). If the authentication (924) is not successful, a corresponding indication can be provided (932) to the user.

When the door alarm sensor is activated (930) and the door locking mechanism is locked (929), a respective indication can be provided (934) to a user. The beacon can send a signal (936) to the remote system indicating that the door alarm sensor is activated and the door locking mechanism is locked.

Figure 10:
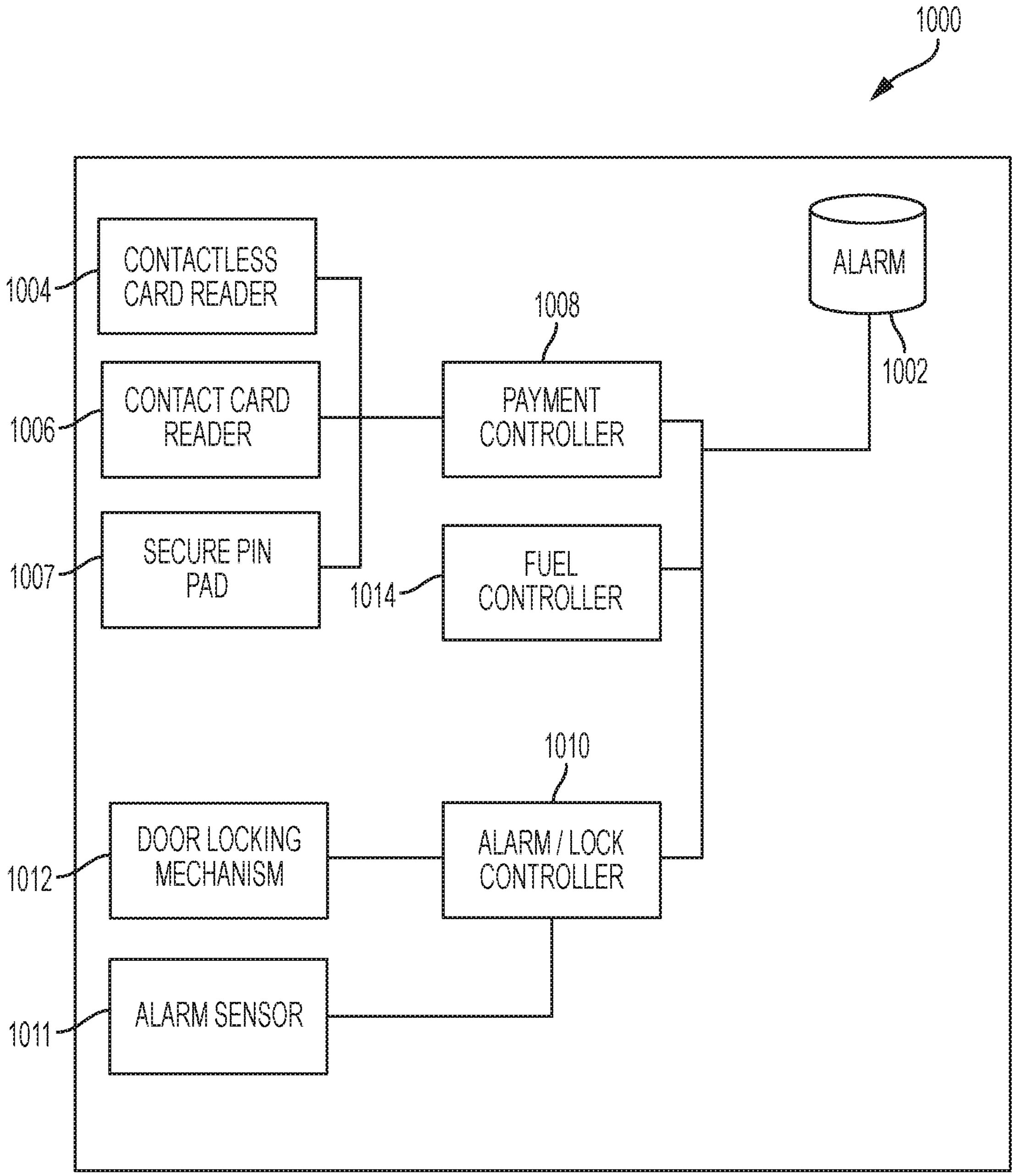
FIG. 10 is a block diagram illustrating components of another embodiment of a fuel dispenser having a payment controller and not including a beacon.

FIG. 10 illustrates an embodiment of a fuel dispenser 1000 that includes a payment module or controller 1008 and that does not include a beacon. As shown, the fuel dispenser 1000 can include a contactless reader 1004 (e.g., a NFC reader), a contact reader 1006 (e.g., a card reader configured to receive a credit card to accept payment to fuel), a secure pin pad 1007 (e.g., a keyboard through which the user can also enter credit card authentication information or any other information), a payment controller 1008, a fuel controller 1014, at least one door locking mechanism 1012, at least one door alarm sensor 1011, an alarm 1002, and an alarm/lock controller 1010. It should be appreciated that any of the readers and/or pin pad can be used to securely receive information used to control access to components of the fuel dispenser.

Figure 11:
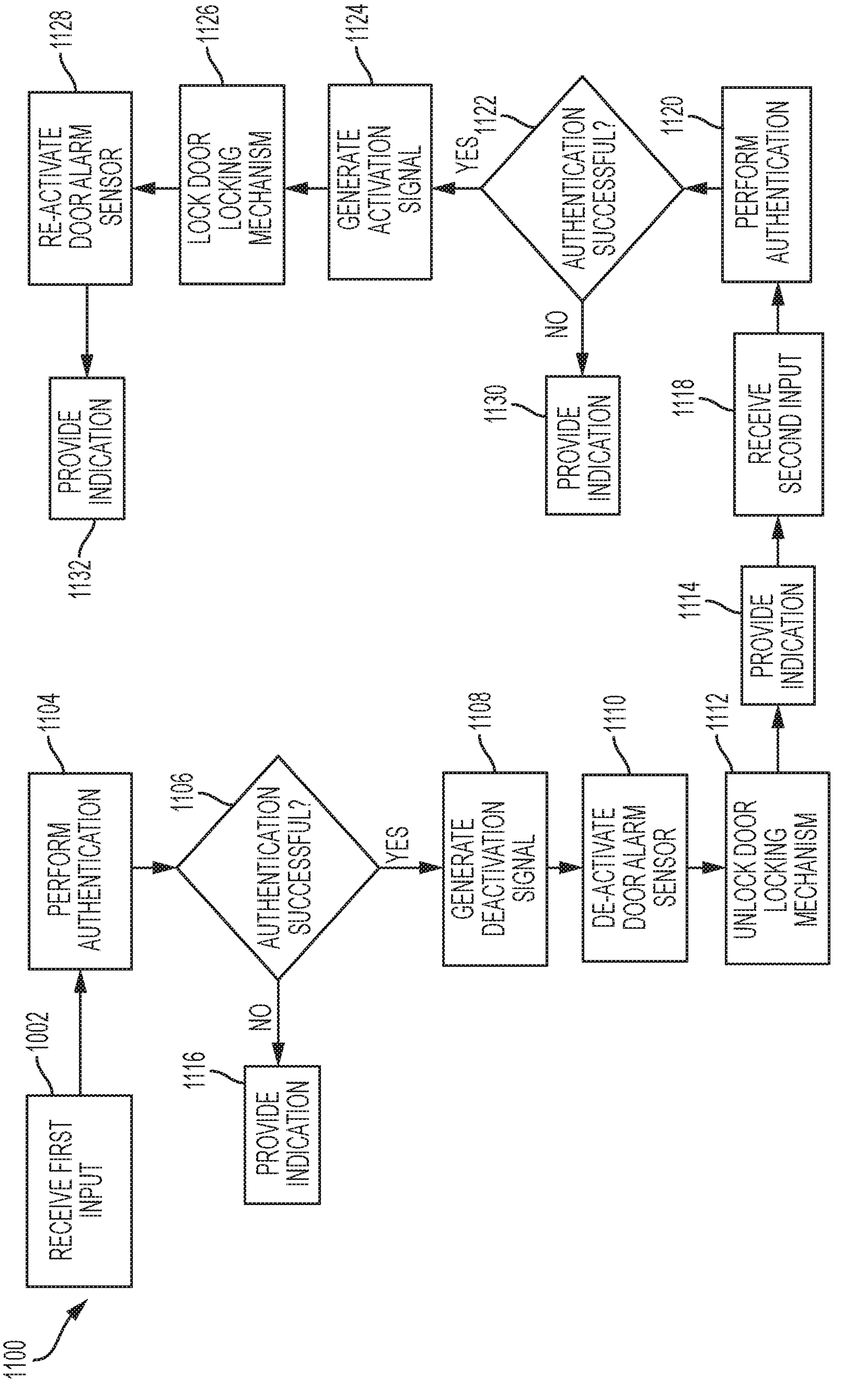
FIG. 11 is a flowchart illustrating a process of operating the fuel dispenser of FIG. 10.

FIG. 11 illustrates a process 1100 for operating the fuel dispenser 1000 of FIG. 10. As shown, a first input can be received (1102) from a portable access device. Information acquired from the portable access device can be used to authenticate (1104) the access device, which can be performed by the payment controller. If the authentication (1106) is successful, the payment controller transmits a deactivation signal (1108) to the alarm/lock controller, in response to which the alarm/lock controller causes the door alarm sensor to be de-activated (1110) and the door locking mechanism(s) to be unlocked (1112). A respective indication can be provided (1114, 1116) to a user as discussed above. After the user opens the unlocked door(s) and performs required operations on components that thus become accessible, the door(s) can be closed. A suitable component of the fuel dispenser, such as the door alarm sensor, can detect that the door(s) has been closed. A second input can then be received (1118) from the portable access device, e.g., when the user again brings the device in proximity to the reader. The payment controller then performs another authentication (1120) of the access device. If the authentication (1122) is successful, the payment controller sends an activation signal (1124) to the alarm/lock controller, in response to which the alarm/lock controller causes the door alarm sensor to be activated (1128) and the door locking mechanism(s) to be locked (1126). If the authentication (1122) is not successful, a corresponding indication can be provided to the user (1130). A respective indication can be provided (1132) to a user informing the user that the door alarm sensor is activated and the door locking mechanism(s) is locked.

Figure 12:
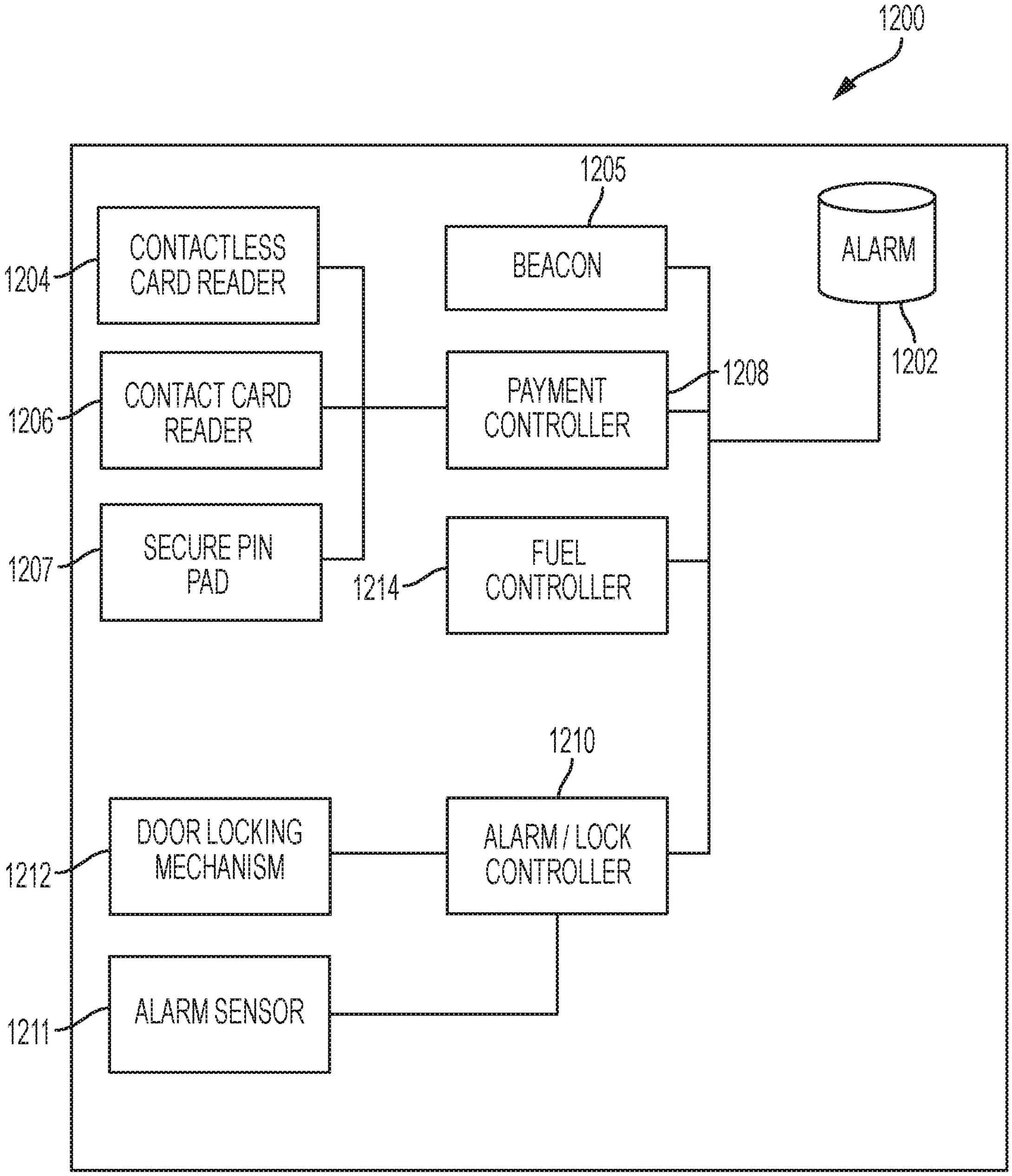
FIG. 12 is a block diagram illustrating components of another embodiment of a fuel dispenser having a payment controller and a beacon.

FIG. 12 illustrates an embodiment of a fuel dispenser 1200 that includes both a payment module and a beacon. As shown, the fuel dispenser 1200 includes a contactless reader 1204 (e.g., a NFC reader), a contact reader 1206 (e.g., a card reader configured to receive a credit card to accept payment to fuel), a secure pin pad 1207 (e.g., a keyboard through which the user can also enter credit card authentication information or any other information), a beacon 1205, a payment controller 1208, a fuel controller 1214, one or more door locking mechanisms 1212, one or more door alarm sensors 1211, an alarm 1202, and an alarm/lock controller 1210. It should be appreciated that any of the card readers and/or pin pad can be used to securely receive information used to control access to components of the fuel dispenser 1200.

Figure 13:
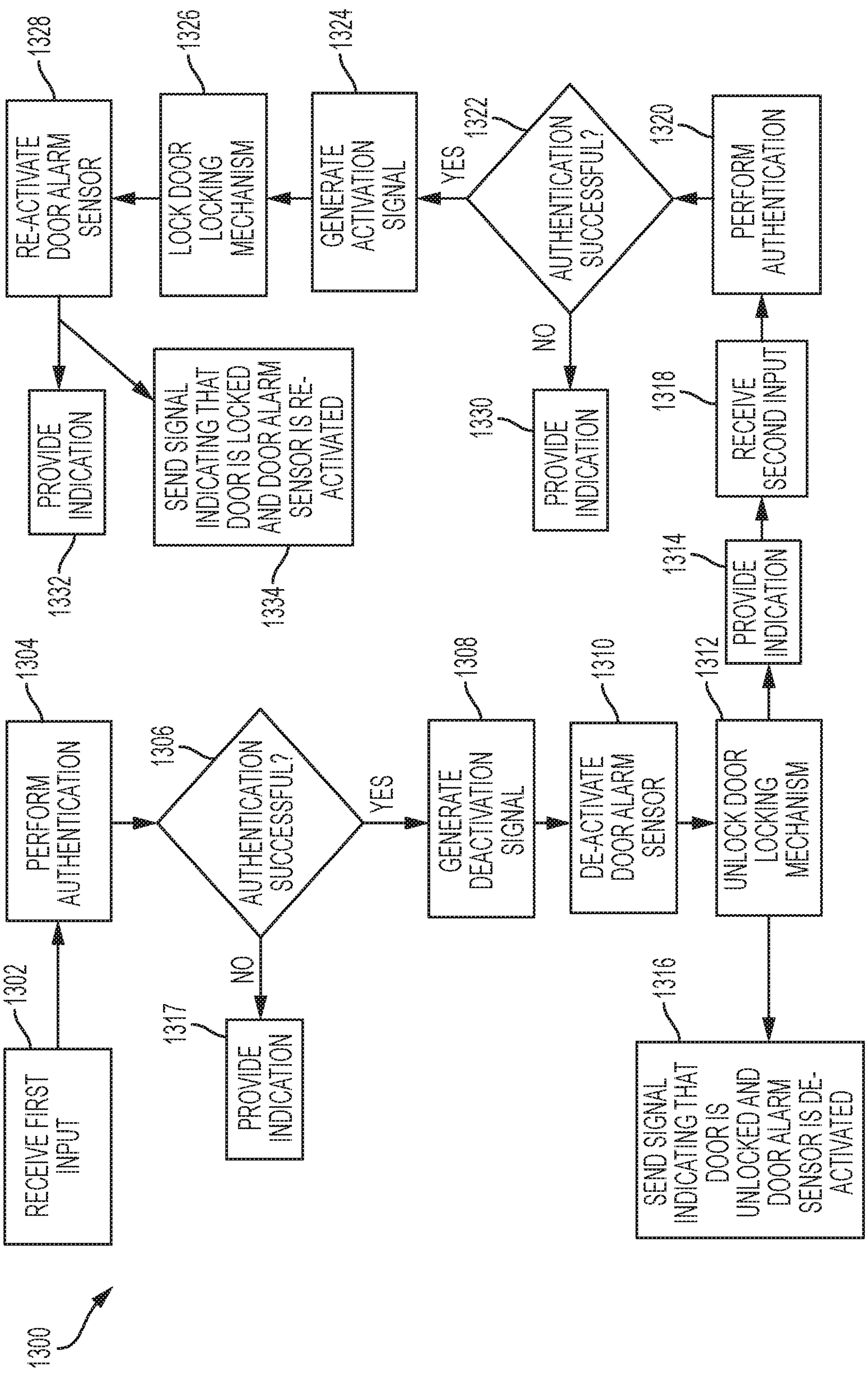
FIG. 13 is a flowchart illustrating a process of operating the fuel dispenser of FIG. 12.

FIG. 13 illustrates a process 1300 for operating the fuel dispenser of FIG. 12. As shown, a first input can be received (1302) from a portable access device. The payment controller can use the information acquired from the device to authenticate (1304) the device. If the authentication (1306) is successful, the payment controller sends a deactivation signal (1308) to the alarm/lock controller, in response to which the alarm/lock controller causes the door alarm sensor to be de-activated (1310) and the door locking mechanism(s) to be unlocked (1312). A respective indication can be provided (1314) to a user, and the beacon can send a signal (1316) to a remote system indicating that the door alarm sensor is de-activated and the door locking mechanism(s) is unlocked. If the authentication (1306) is not successful, a corresponding indication can be provided (1317) to the user.

After the user opens the unlocked door(s) and performs required operations on components that thus become accessible, the door(s) can be closed. A suitable component of the fuel dispenser, such as the door alarm sensor, can detect that the door(s) has been closed. A second input can then be received (1318) from the access device, e.g., when the user again brings the card in proximity to the card reader. The payment controller then performs (1320) another authentication of the access device. If the authentication (1322) is successful, the payment controller sends an activation signal (1324) to the alarm/lock controller, in response to which the alarm/lock controller causes the door alarm sensor(s) to be activated (1328) and the door locking mechanism(s) to be locked (1326). If the authentication (1322) is not successful, a corresponding indication can be provided (1330) to the user. A respective indication can be provided (1332) to a user informing the user that the door alarm sensor(s) is activated and the door locking mechanism(s) is locked. Also, the beacon can send a signal (1334) to the remote system indicating that the door alarm sensor(s) is activated and the door locking mechanism(s) is locked.

In some embodiments, as discussed above, access to various components of a fuel dispenser can be controlled using a portable access device or an access code that can be acquired via a secure pin pad or other device. Furthermore, in some embodiments, access to a fuel dispenser can be controlled based on biometric identification of a user which involves acquiring and processing biometrics information from the user. The biometrics information, which can be acquired in a contact or non-contact manner, can include facial, iris, fingerprint, ear, palm (e.g., palm vein) information, full-body information, full-hand information, voice, and any other measurable and distinct information that can characterize a user and that can be acquired from the user attempting to access a fuel dispenser.

Because biometrics information is non-transferable, always present (unlike an access device, PIN, password, etc.) and can be relatively easily acquired from a user, use of biometrics authentication to identify or verify user's identity simplifies control of access to components of a fuel dispenser while increasing security. In this way, a more user-friendly experience can be provided. In some embodiments, a use of biometrics information can replace use of a portable access device (e.g., a mobile phone, card, etc.) or a password manually entered by a user. In other embodiments, however, a fuel dispenser can include a portable access device reader, keyboard, and/or components configured to acquire and process biometrics information.

Biometrics information can be acquired when a user attempt to access a fuel dispenser is detected. Such an attempt can be detected automatically, for example, by detecting a presence of a person in proximity to the fuel dispenser. The fuel dispenser can then provide a prompt requesting the user to provide biometrics information. In some embodiments, the user can be required to explicitly indicate his or her presence, e.g., by providing biometrics information or in other manner. To provide the biometrics information, the user can be required to be positioned with respect to the fuel dispenser so that at least one image of user's face, retina, iris, ear, palm, body, etc. can be acquired by the fuel dispenser (e.g., by a biometrics reader). Some biometrics information, such as, for example, fingerprint information, can be acquired in a contact manner, and the user may be required to bring one or more of his or her fingers in contact with a biometrics reader having a fingerprint reader (e.g., sensor, imager, or scanner). Other biometrics information can also be acquired in a contact manner, such as, e.g., a palm print image.

Once the biometrics information is acquired, authentication of the acquired information is performed, which involves accessing a server device that stores biometrics information in association with other user's information. The server device can be a remote device, such as a cloud network server, or any other suitable device configured to securely store biometrics and other information. The server can also be a local storage and processing device. The server is configured to process and analyze (e.g., compare) various types of biometrics information.

Regardless of the type of the server device and whether it is or includes at least one of a remote and local server, the server can be accessed to identify whether there is a match between the biometrics information acquired from a user attempting to access the fuel dispenser and information stored on or in association with the server. Before being able to access the fuel dispenser such that one or more of fuel dispenser's doors become unlocked and associated door alarm sensor(s) are de-activated, a user can be required to register with the server. The registration can be done at a fuel dispenser or using any other suitable device that can be located at any suitable location (e.g., at a service provider's computer). For example, a company employee (a store attendant, technician, inspector, etc.) can be required to register with a service providing access to fuel dispensers such that information, including unique biometrics information, on that user is obtained and stored at the server. Information on each registered user can be stored in a corresponding user profile. Information on a user's access level can be part of the user profile stored at the server in association with user's biometrics information.

As mentioned above, the user authentication involves comparing the acquired biometrics information to information stored on the server. The authentication can be performed at least in part on the server, and the biometrics information acquired by the fuel dispenser is encrypted before being sent to the server. In some embodiments, a processor of the fuel dispenser processes the acquired biometrics information before sending a representation, such as a plurality of features, to the server for compassion with similar stored representations of biometrics information. Furthermore, in some embodiments, at least one processor of the fuel dispenser can perform the authentication, at least in part. Regardless of the specific authentication technique, if a match is identified, an access to the fuel dispenser is provided. In particular, as discussed above, one or more door alarm sensors are de-activated and at least one door locking mechanism is unlocked to provide access to components of the fuel dispenser.

It should be appreciated that a "match" can be determined with accuracy that depends on characteristics of a technique used to process the biometrics information. For example, a match can be a nearest match. In some cases, if the comparison results in more than one match, or in other situation when user biometrics identification with a desired accuracy is not achieved, additional biometrics information can be acquired from the user.

One or more doors can be unlocked based on an access level associated with the user. As an example, if a user is a store attendant in a retail fueling facility, or another person authorized to access only some components of the fuel dispenser, such as a printer door, an alarm/lock controller will instruct only the printer door to unlock. As another example, if a user is a technician or a service person, his/her access level can cause an electronics module door and a printer door to unlock. As a further example, a user can be an inspector permitted to inspect the entirety of the fuel dispenser such that access to all doors (e.g., a base module door, an electronics module door, and a printer door) of the fuel dispenser can be provided by unlocking a locking mechanism of each of the doors. The inspector may be required to, for example, examine a leak in the fuel dispenser, to determine status of one or more fuel dispenser's components and/or to determine compliance of the fuel dispenser and its operation to code requirements. Some issues may need to be addressed by both a technician and an inspector, or by any other type of user. It should be appreciated that an access level of a user can be established in any desired manner, and any suitable number of access levels can be used. For example, user information associated with a technician can allow that person to access all of the doors, including the base module door.

After interior components of the fuel dispenser are accessed, at least one unlocked door can be locked and an associated door alarm sensor can be re-activated. To activate a door locking mechanism and re-activate the door alarm sensor, biometrics information may again be acquired from the user, which can be the same or different information than the information required to unlock the door.

Figure 14:
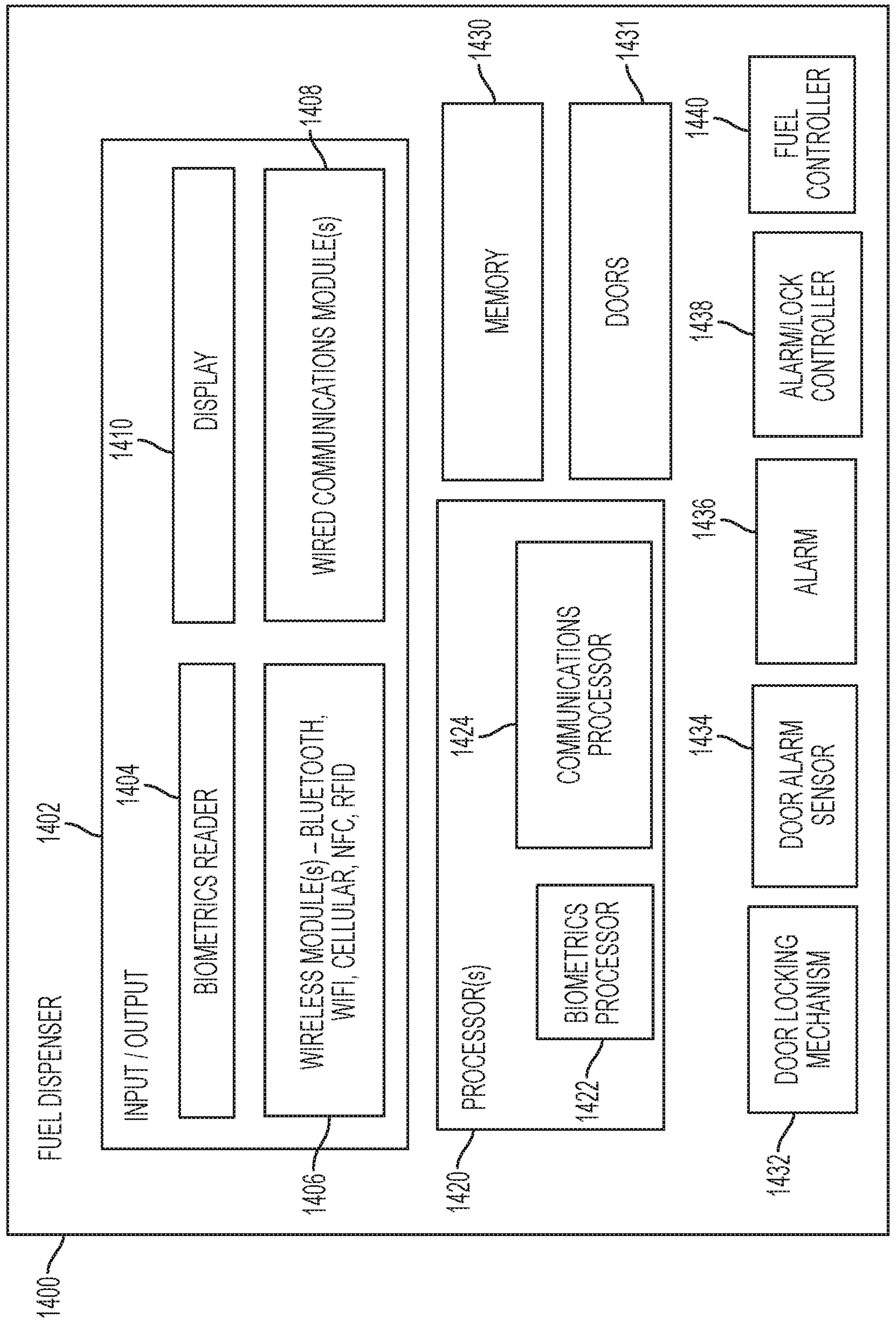
FIG. 14 is a block diagram illustrating one embodiment of a fuel dispenser.

As shown in FIG. 14, a fuel dispenser 1400 includes input/output modules 1402, which can include biometrics reader 1404, wireless module(s) 1406, wired communications module(s) 1408, and a display 1410. At least one processor 1420 of the fuel dispenser 1400 can include at least one biometrics processor 1422 and a communications processor 1424. The fuel dispenser 1400 includes memory 1430. As shown in FIG. 14, the dispenser 1400 also includes at least one door locking mechanism 1432 configured to lock one or more doors 1431 of the fuel dispenser 1400, at least one door alarm sensor 1434, an alarm 1436 (e.g., a component configured to generate an alarm that can be audible or in any other format, including a signal communicated to a service provider's computer), and an alarm/lock controller 1438 configured to control the locking mechanism 1432, the door alarm sensor 1434, and the alarm 1436. For example, the alarm/lock controller 1438 can cause the door locking mechanism 1432 on the door to lock and unlock and can cause the door alarm sensor 1434 to be de-activated and activated or re-activated. The doors 1431 can include at least a first door on a base module of the fuel dispenser controlling access to the fuel dispensing components, a second door on an electronics module of the fuel dispenser controlling access to the electronics module, and a third door on the electronics module controlling access to a printer of the electronics module.

The fuel dispenser 1400 can include other components, such as a fuel controller 1440 shown in FIG. 14. The fuel controller 1440 can be coupled to fuel dispensing components in a base module of the fuel dispenser 1400. The fuel controller 1440 can be instructed to disallow use of the fuel dispensing components when the at least one locking mechanism 1432 is unlocked and the door alarm sensor 1432 is de-activated.

The biometrics processor 1422 can include various other processors, such as, for example, an image processor, a voice recognition processor, a processor configured to pre-process biometrics information, etc. The biometrics processor 1422 can include at least one feature extractor configured to identify features related to user's face (entire face or its parts), user's body parts, user's voice, etc.

The biometrics reader 1404 can have various configurations. For example, it can include an image sensor such as a digital still or video camera, or other type of an optical sensor. The biometrics reader 1404 can also include a video camera suitable for capturing biometric facial, iris, retina, palm, and other features. The biometrics reader 1404 can also include a voice recorder and other devices configured to acquire user biometrics information. In some embodiments, the biometrics reader 1404 can be a multi-modal biometrics device configured to acquire more than one type of biometrics information from a user for biometric authentication of the user.

Biometrics information acquired by the biometrics reader 1404 and which can be pre-processed by the processor 1420 of the fuel dispenser 1400 (e.g., features can be extracted in a suitable format), can be provided via the dispenser's communications module(s) (e.g., wireless module(s) 1404 and/or wired communications module(s) 1408) to a server, which can be a remote or a local server.

Figure 15:
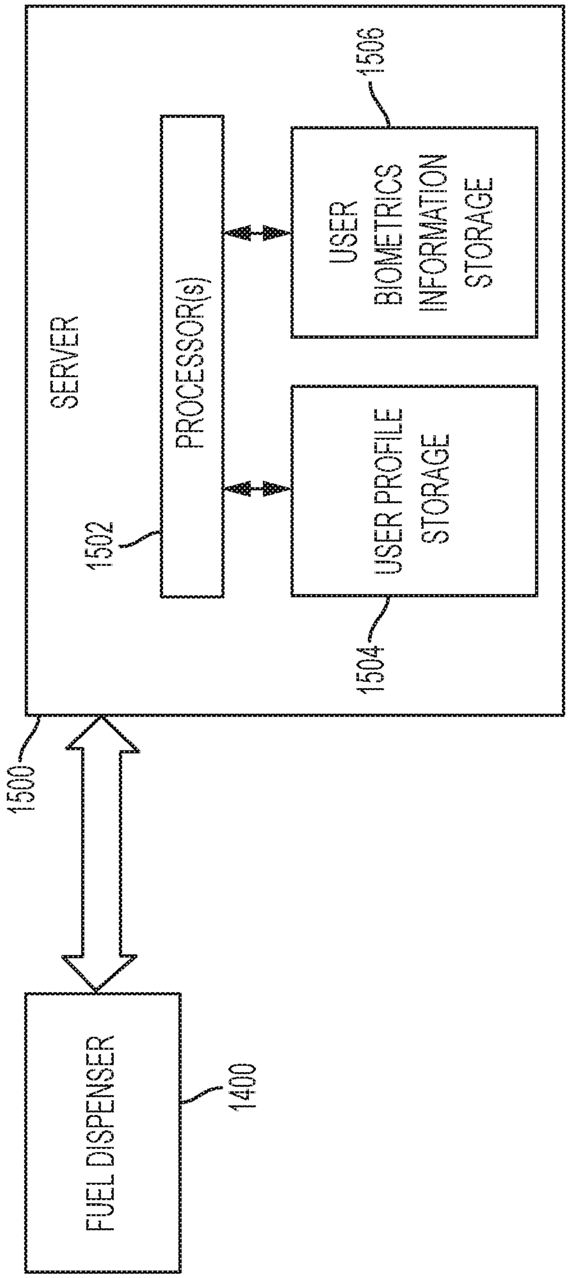
FIG. 15 is a block diagram illustrating the fuel dispenser of FIG. 14 and a server.

A server 1500 communicatively coupled to the fuel dispenser 1400 via at least one of a wireless and wired connection is shown in FIG. 15. In some embodiments, the server 1500 is a cloud network server providing cloud technology services. The server 1500 can include at least one processor 1502 and it can also include or can access a user profile storage 1504 (e.g., one or more databases). The server 1500 can also include or can access biometrics information storage 1506 that can be accessed by the fuel dispenser 1400, to compare known biometrics information stored with the server 1500 to the biometrics information acquired from a user attempting to access the fuel dispenser 1400. The user profile storage 1504 and the user biometrics information storage 1506 can be, for example, one or more databases stored in suitable memory, which can be cloud storage or storage that is updated from a cloud. Either or both of the user profile storage 1504 and the user biometrics information storage 1506 can be distributed database(s). The user profile storage 1504 can include user profiles for each known (e.g., registered) user, and associated known biometrics information can be stored, in any suitable format, in the user biometrics information storage 1506. User profiles include user access level indicating what components of a fuel dispenser the user is allowed to access. In some embodiments, the level of permitted access can additionally be associated with a particular fuel dispenser, particular site, etc. The user profile and/or identity, as well as the access level, can be transmitted from the server 1500 to the fuel dispenser 1400.

The user profile and associated access level can be received by the communications processor 1424 and can be stored in the memory 1430 of the fuel dispenser 1400 (FIG. 1400). The user profile can be used by the communications processor 1424 to provide access to the fuel dispenser based on the access level associated with that particular user and other information associated with the user profile. In addition, in some embodiments, information can be rendered on the display 1410, based on user preferences that can be specified in the user profile. In at least some implementations, the fuel dispenser can render on the display 1410 any suitable information that facilitates user's servicing the fuel dispenser.

Figure 16A:
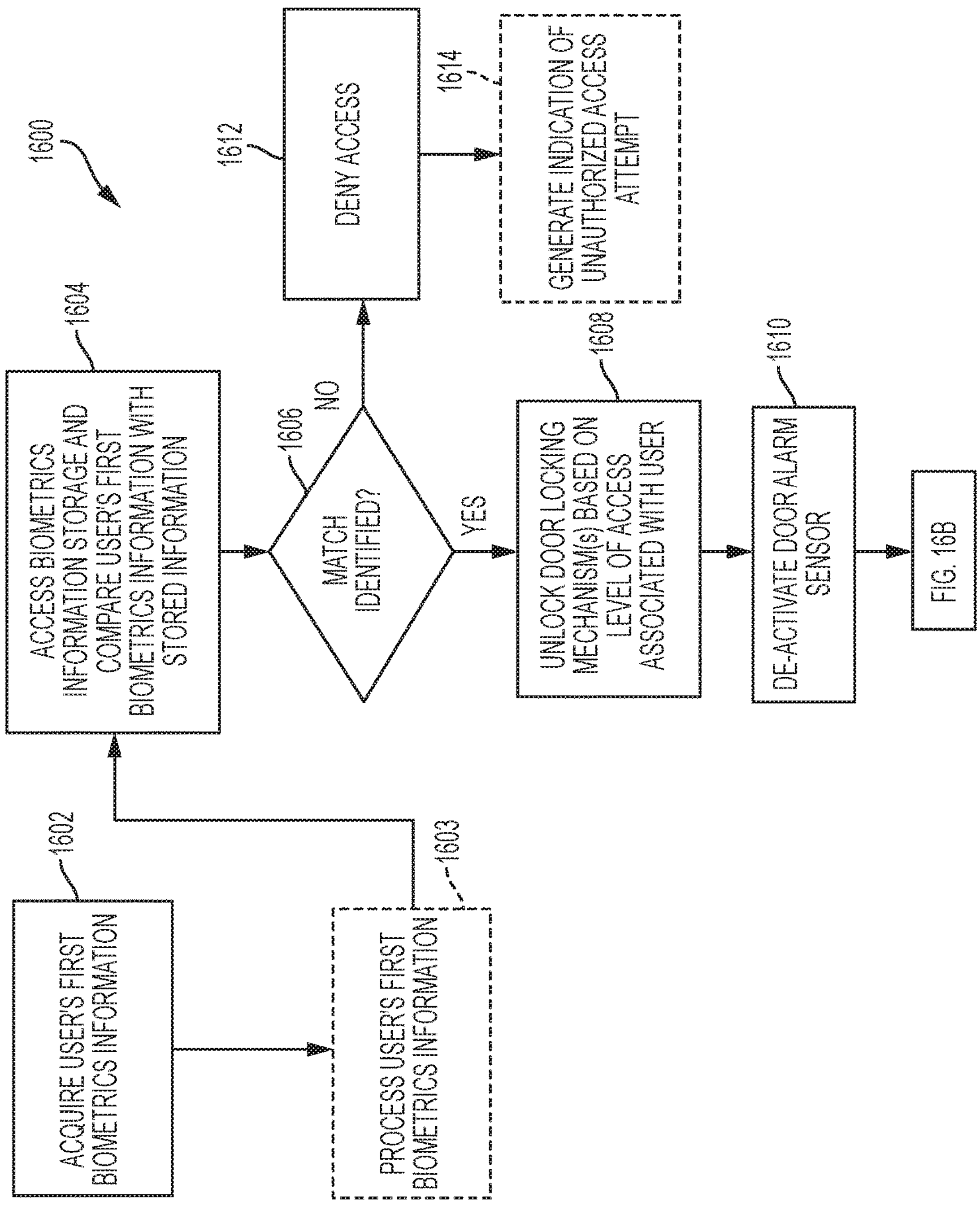
FIG. 16A is a flowchart illustrating one embodiment of a process of operating a fuel dispenser to unlock at least one door of the fuel dispenser.

FIG. 16A is a process flow diagram illustrating one embodiment of a process 1600 for operating a fuel dispenser. The process 1600 can begin, for example, when user input is received (e.g., via a display of the fuel dispenser) including an instruction for the fuel dispenser to enter a maintenance mode. In such a mode, fueling components of a fuel controller can be de-activated such that fueling cannot be performed during maintenance and/or servicing of the fuel dispenser. After the door has been locked and the door alarm sensor is activated (or re-activated), the fueling components can be activated and the fuel dispenser can be used to pump fuel. In some embodiments, the fueling components can be activated after the door has been locked and the door alarm sensor is activated and after the fuel dispenser receives an instruction to exit the maintenance mode. The process 1600 can begin in response to any other trigger.

As shown in FIG. 16A, at block 1602, a fuel dispenser (e.g., fuel dispenser 1 of FIG. 1, fuel dispenser 1400 of FIG. 14, or any of the other fuel dispensers described herein or similar fuel dispensers) having a biometrics reader can acquire user's first biometrics information. The biometrics information can include at least one image (e.g., a video image or a still image) of a user's face, fingerprint, iris, retina, ear, palm, hard, or any other information such as voice, DNA, etc. The acquired user's first biometrics information can optionally be processed by at least one processor of the fuel dispenser, at block 1603.

The fuel dispenser (e.g., at least one communication module thereof), at block 1604, accesses biometrics information storage (e.g., one or more databases). The fuel dispenser can access a remote or local server (or both remote and local servers) storing the biometrics information and/or in communication with the biometrics information storage. In some embodiments, the biometrics information storage can be stored locally in the fuel dispenser. Also, in some implementations, various types of user profiles can be stored on different servers. For example, user profiles of fueling station's clerks can be stored locally, e.g., with the fuel dispenser or in a computer at the fueling stations. At the same time, user profiles of technicians, inspectors, or other personnel can be stored in external storage with can be accessed remotely.

Further, at block 1604, the acquired user's first biometrics information is compared to information stored at the biometrics information storage. It is then determined, at decision block 1606, whether a match has been identified as a result of the comparison. If the match has been identified, the process 1600 continues to block 1608 where at least one door locking mechanism (which can be part of a door lock kit) can be unlocked based on a level of access associated with the user. As discussed above, the biometrics information storage can store a plurality of user profiles each of which can specify user's rights with respect to accessing a fuel dispenser. For example, the user's rights can include a user's level of access determining what components of the fuel dispenser the user is allowed to access. Also, the user's rights can specify a manner in which a fuel dispenser can communicate with the user.

When the match is identified, a user profile stored for the user attempting to access the fuel dispenser is accessed and the user's level of access is used to determine which door locking mechanism is allowed to be unlocked. Also, as shown in FIG. 16A, at least one door alarm sensor is deactivated at block 1610. As discussed above, the door alarm sensor is disabled or deactivated simultaneously with unlocking one or more doors in a housing of the fuel dispenser. Thus, the processing at blocks 1608, 1610 can be performed at least in part simultaneously.

If it is determined at decision block 1606 that the match is not identified, an access to the fuel dispenser is denied, as shown at block 1612 in FIG. 16A. In some embodiments, an indication of an attempt of an unauthorized access to the fuel dispenser can be generated, at block 1614. For example, an alarm can sound, or the indication can be provided in any other format. A suitable entity can also be notified of the unauthorized access. It should be noted, if the user's biometrics information is not recognized, the user may be prompted for at least one another attempt to provide biometrics information. Thus, the indication of the unauthorized access attempt can be generated when repeated attempts to disable one or more door locks of the fuel dispenser are detected.

Figure 16B:
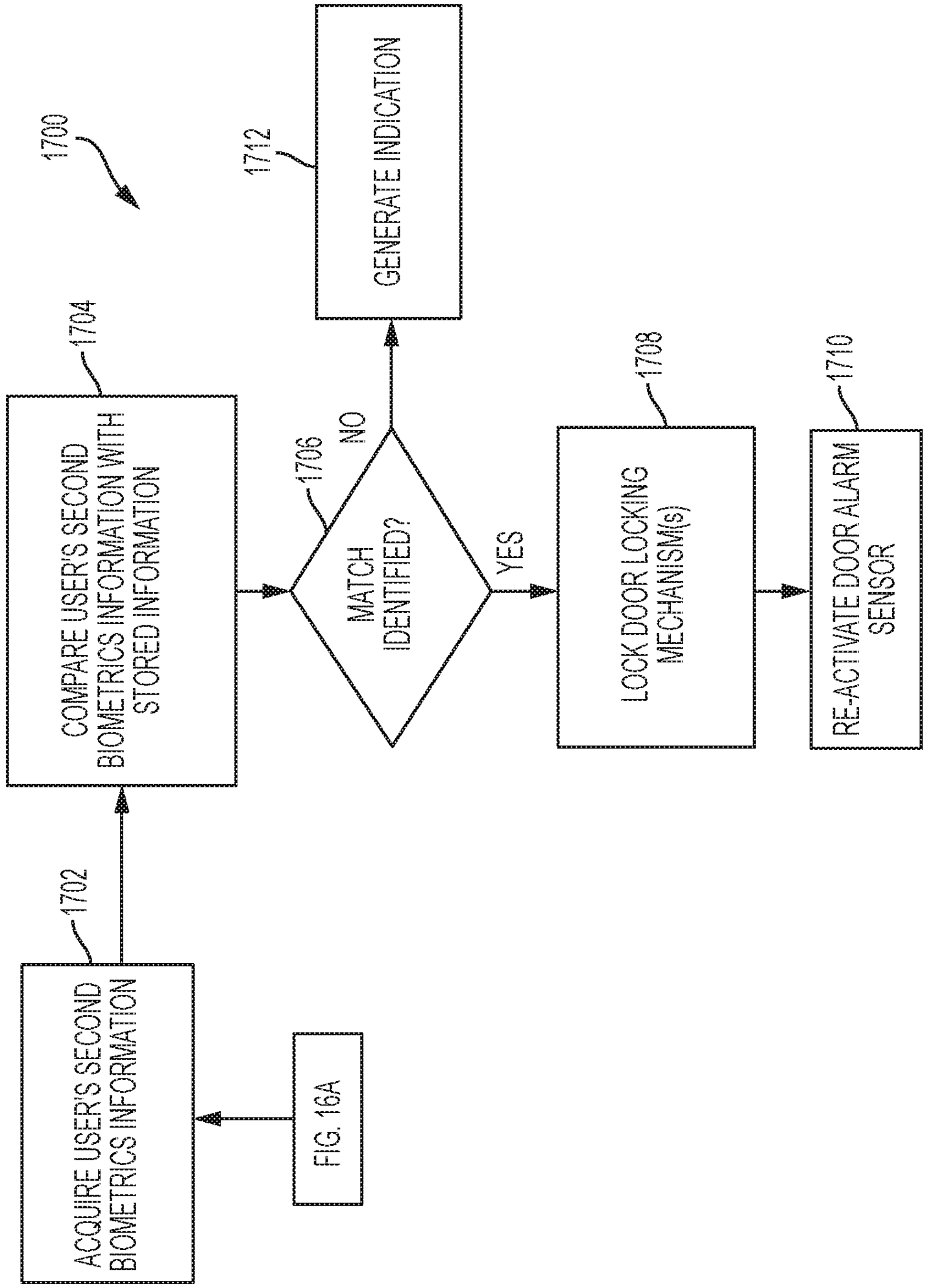
FIG. 16B is a flowchart illustrating one embodiment of a process of operating a fuel dispenser to lock at least one door of the fuel dispenser.

After the processing at blocks 1608, 1610 and after the user opens the unlocked door(s) and performs required operations on components that thus became accessible, the door(s) can be closed. To lock the closed door, biometrics authentication can again be performed to lock the door and re-activate the door alarm sensor. FIG. 16B illustrates one embodiment of a process 1700 that can be used to lock the door of the fuel dispenser when it is determined that the user is authorized to do so. The process 1700 can begin, for example, when it is detected that the door is closed, or in response to another trigger.

As shown in FIG. 16B, at block 1702, user's second biometrics information can be acquired. The second biometrics information can be the same or different from the first biometrics information acquired at block 1602 of FIG. 16A. At block 1704, the acquired second biometrics information can be compared to stored biometrics information. In at least some embodiments, as discussed above, the user profile can be retrieved from the server when the server is accessed with the first biometrics information. The retrieved user profile (and any association data) can be stored, at least in part, in memory of the fuel dispenser (or in another local memory, such as on a local server) and the information can be used to authenticate the user attempting to lock the fuel dispenser's door. In this way, there may be no need to access external biometrics information storage, such as on a remote server, to lock the door(s). Alternatively, in some embodiments, the fuel dispenser can communicate with a remote server to again access the biometrics information storage stored therein, to compare the acquired second biometrics information to known biometrics information to authenticate the user.

Regardless of the specific way in which the comparison is performed, at decision block 1706 it can be determined whether a match to the acquired second biometrics information has been identified among the stored biometrics information. If the match has been identified, the process 1700 branches to block 1708 where the door locking mechanism is locked Kkk. The door alarm sensor can be reactivated at block 1710, which can be done simultaneously with locking the door. If it is determined, however, that the match has not been identified, the process 1700 branches to block 1712 where an appropriate indication of an unsuccessful attempt to authenticate a user to look the door is generated. The indication can be generated after a certain number of attempts to lock the door are detected.

Figure 17:
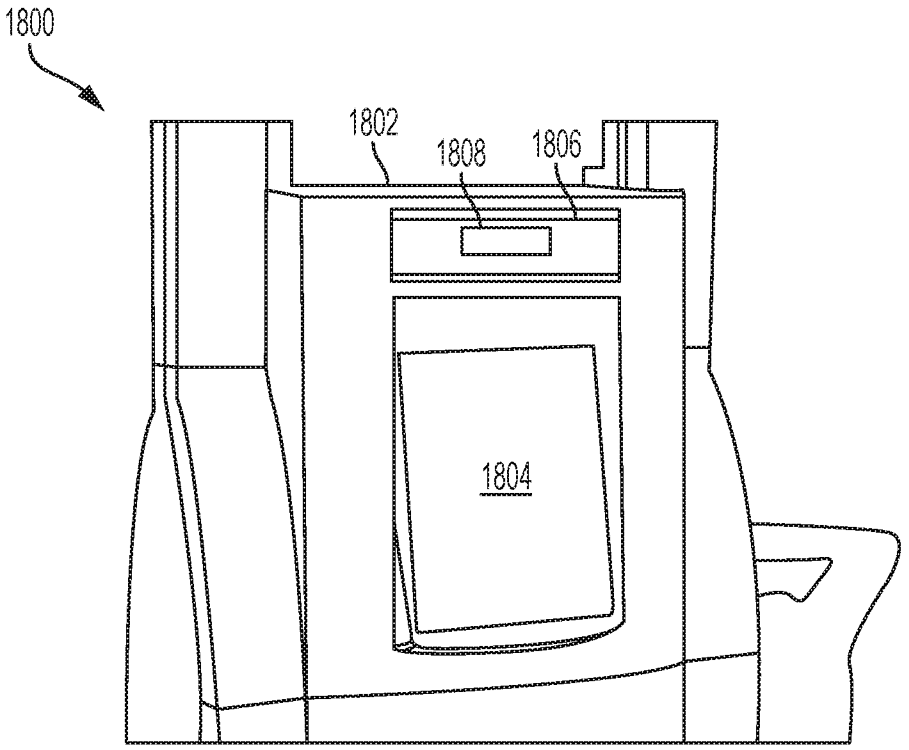
FIG. 17 is a perspective partial view of one embodiment of a fuel dispenser.

FIG. 17 illustrates an embodiment of a fuel dispenser 1800 that can be configured and used as described for any of the various embodiments described herein. Only an intermediate portion of the fuel dispenser 1800 is illustrated, e.g., top and bottom portions of the fuel dispenser are omitted. The fuel dispenser 1800 includes a housing 1802, a display 1804 attached to the housing 1802, electronics (not shown) (e.g., a processor, a memory, wireless module(s), etc.) disposed within the housing 1802, and an information panel 1806 attached to and/or disposed in the housing 702. The display 1804 includes a GUI display space and, in some embodiments, at least a portion thereof can be a flexible touchscreen. The fuel dispenser 1800 also includes fuel dispensing components, such as a pump, a fuel meter, a nozzle, a hose, etc., which are not shown for the sake of brevity.

The information panel 1806 is configured to facilitate payment and/or fueling. In the illustrated embodiment, as shown in FIG. 17, the information panel 1806 includes at least one biometrics reader 1808 that can be configured to receive biometrics information. The biometrics reader 1808, which can be a single-mode or multi-mode reader, and it can have various shapes and sizes. The biometrics reader 1808 can include a digital still or video camera configured to acquire images of a face, retina, iris, palm, hand, fingerprints, or any other parts of the user's face or body to acquire biometrics information. The biometrics reader 1808 can additionally or alternatively include a voice recorder configured to acquire user's voice. It should be appreciated that the biometrics reader 1808 is shown by way of example only, as it can be disposed at other locations of the fuel dispenser 1800 that allows users to conveniently communicate with the fuel dispenser 1800 and to provide one or more types of biometrics information. The biometrics reader 1808 can be configured to acquire any suitable biometrics information from the user to verify user's identity.

Furthermore, in some embodiments, the information panel 1806 can include a card reader (e.g., any of card reader 23 of FIG. 1, card reader 314, 318 of FIG. 3, card readers 604, 606 of FIG. 6, card reader 706 of FIG. 7, card reader 806 of FIG. 8, card readers 1004, 1006 of FIG. 10, card readers 1204, 1206 of FIG. 12, or any other card readers) and/or any suitable pin pad or keyboard. When the fuel dispenser is in a fueling mode, during fueling, the information panel 1806 can show amounts of fuel pumped in a fueling session, prices of different grades of fuel, etc. In some embodiments, at least one of the information panel 1806 and the display 1804 can be configured to display information about a status of the fuel dispenser and/or one or more of its components. Also, during servicing of the fuel dispenser as described herein, information (e.g., instructions, fuel dispenser status information, etc.) that can assist in performing the service can be rendered on at least one of the information panel 1806 and the display 1804. Such information can be provided in the form of a video, including a video of an actual or a virtual person. The display 1804 can be interactive such that it can receive user input.

It should be appreciated that the fuel dispensers described herein in connection with FIGS. 14 to 17 can include any of the components of the fuel dispensers described in connection with FIGS. 1 to 13. The fuel dispensers configured to receive biometrics information and use this information for verifying user's identity can be fuel dispensers of any type. In some embodiments, the fuel dispensers can be intelligent fuel dispensers. The intelligent fuel dispensers can be configured to provide virtual assistance to customers and other users via a display of the fuel dispenser.

Although an exemplary retail fueling facility, which can sell retail gasoline and/or diesel fuels for general-purpose vehicles (e.g., automobiles and/or trucks), has been described herein, other implementations can be deployed in other fuel dispensing applications, such as commercial, wholesale, or private fuel dispensing installations. Fuels that are dispensed can, for example, be for automotive, aviation, and/or marine vehicles.

Although the current subject matter has been described with respect to acquiring biometrics information and identifying characteristics of a user, such as a store attendant, technician, or other person knowledgeable with the functioning of the fuel dispenser, other implementations are possible. For example, a fuel dispenser can also or instead acquire biometrics information from customers desiring to fuel a vehicle. The biometrics information can be used to verify user's identity, based on which a fueling session and payment for the fuel can be conducted.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A fuel dispenser, comprising:

a housing having a base module with fuel dispensing components disposed therein, and an electronics module with electronics for controlling the fuel dispensing components;

a first door coupled to the housing and associated with a first locking mechanism configured to lock and unlock the first door to control access to components within the housing;

a first door alarm sensor configured to sense when the first door is opened and closed;

a controller disposed in the housing and coupled to the first locking mechanism and the first door alarm sensor, the controller being configured to control the first locking mechanism and the first door alarm sensor;

a reader operatively coupled to the controller and configured to receive a first input; and a communication module operably coupled to the reader and to a network cloud, the communication module being configured to authenticate the first input by comparing the first input to a pre-set input on the network cloud, the communication module being configured to send a deactivation signal to the controller such that the controller unlocks the first locking mechanism and de-activates the first door alarm sensor for the first door.

2. The fuel dispenser of claim 1, wherein the controller is configured to lock the first locking mechanism and to activate the first door alarm sensor for the first door in response to the reader receiving and authenticating a second input.

3. The fuel dispenser of claim 2, wherein, in response to the first input, the controller transmits a first signal to cause the first locking mechanism to unlock and to cause the door alarm to de-activate for the first door, and wherein, in response to the second input, the controller transmits a second signal to cause the first locking mechanism to lock and to cause the door alarm to activate for the first door.

4. The fuel dispenser of claim 1, wherein the reader is configured to obtain information stored on a portable access device.

5. The fuel dispenser of claim 1, wherein the reader comprises a contactless near field communication reader.

6. The fuel dispenser of claim 1, wherein the reader is configured to obtain at least one type of biometrics information from a user.

7. The fuel dispenser of claim 1, wherein, when the first locking mechanism is unlocked and the first door alarm sensor is de-activated for the first door, the fuel dispenser is configured to provide a first indication indicating that the first locking mechanism is unlocked and the first door alarm sensor is de-activated for the first door.

8. The fuel dispenser of claim 1, wherein the first door alarm sensor comprises a magnetic sensor.

9. The fuel dispenser of claim 1, wherein the first door comprises at least one of a fuel door on the base module controlling access to the fuel dispensing components, an electronics door on the electronics module controlling access to the electronics module, and a printer door on the electronics module controlling access to a printer of the electronics module.

10. The fuel dispenser of claim 1, further comprising a fuel controller coupled to the fuel dispensing components in the base module, the reader being configured to instruct the fuel controller to disallow use of the fuel dispensing components when the first locking mechanism is unlocked and the first door alarm sensor is de-activated for the first door.

11. The fuel dispenser of claim 1, wherein the first locking mechanism comprises an electronic locking mechanism having a latch movable between a locked position in which the latch engages the first door to prevent movement of the first door, and an unlocked position in which the latch is disengaged from the first door to allow the first door to be opened.

12. The fuel dispenser of claim 1, further comprising an alarm coupled to the controller and configured to transmit an audible signal when the first door is attempted to be opened while locked.

13. The fuel dispenser of claim 1, further comprising a second door coupled to the housing and associated with a second locking mechanism configured to lock and unlock the second door to control access to second components within the housing;

wherein the door alarm sensor is configured to sense when the second door is opened and closed, and the controller is coupled to and configured to control the second locking mechanism; and wherein the controller is configured to unlock only the first locking mechanism and de-activates the door alarm sensor only for the first door in response to authenticating the first input while the second locking mechanism remains locked and the door alarm sensor remains active for the second door.

14. The fuel dispenser of claim 13, wherein the first door comprises one of a fuel door on the base module controlling access to the fuel dispensing components, an electronics door on the electronics module controlling access to the electronics module, and a printer door on the electronics module controlling access to a printer of the electronics module; and wherein the second door comprises one other of the fuel door on the base module controlling access to the fuel dispensing components, the electronics door on the electronics module controlling access to the electronics module, and the printer door on the electronics module controlling access to the printer of the electronics module.

15. A door lock and alarm control kit, comprising:

a controller configured to be mountable within a housing in a fuel dispenser;

a first electronic door locking mechanism electrically coupled to the controller such that the controller is configured to cause the first electronic door locking mechanism to switch between a locked configuration, in which a first latch on the first electronic door locking mechanism is closed, and an unlocked configuration, in which the first latch on the first electronic door locking mechanism is open;

a first door alarm sensor coupled to the controller and having a first component configured to be mountable in a fuel dispenser and a second component configured to be mountable on a first door of a fuel dispenser such that the first door alarm sensor can detect open and closed positions of the first door, the controller configured to move the first locking mechanism to the unlocked configuration and to de-activate the first door alarm sensor upon receipt of a first deactivation signal;

a reader configured to receive user information from a portable access device; and a communication module operably coupled to the reader and to a network cloud, the communication module being configured to transmit the user information to the network cloud for comparison to pre-existing information on the network cloud, the communication module being configured to send the first deactivation signal to the controller when the user information matches the pre-existing information.

16. The kit of claim 15, further comprising a first alarm configured to emit an audible signal based on detection of an open position of the first door by the first alarm sensor.

17. The kit of claim 15, wherein the controller is configured to cause the first locking mechanism to move to the locked configuration and is configured to activate the first door alarm sensor in response to information obtained by the reader.

18. The kit of claim 15, wherein the reader comprises a near field communication reader.

19. The kit of claim 15, further comprising:

a second electronic door locking mechanism electrically coupled to the controller such that the controller is configured to cause the second electronic door locking mechanism to switch between a locked configuration, in which a second latch on the second electronic door locking mechanism is closed, and an unlocked configuration, in which the second latch on the second electronic door locking mechanism is open; and a second door alarm sensor coupled to the controller and having a third component configured to be mountable in a fuel dispenser and a fourth component configured to be mountable on a second door of the fuel dispenser such that the second door alarm sensor can detect open and closed positions of the second door, the controller configured to move the second locking mechanism to the unlocked configuration and to de-activate the second door alarm sensor upon receipt of a second deactivation signal.

* * * * *